US012634483B2

(12) United States Patent
Kim et al.

(10) Patent No.:  US 12,634,483 B2
(45) **Date of Patent:  *May 19, 2026**

(54) METHOD FOR ADAPTIVELY SETTING RESOLUTION, AND IMAGE DECODING APPARATUS

(71) Applicant: SK TELECOM CO., LTD., Seoul (KR)

(72) Inventors: Jae Il Kim, Seoul (KR); Sun Young Lee, Seoul (KR); Kyung Hwan Ko, Seoul (KR); A Ram Baek, Sejong-si (KR); Se Hoon Son, Seoul (KR); Jae Seob Shin, Seoul (KR); Tae Young Na, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/830,960

(22) Filed: Sep. 11, 2024

(65) Prior Publication Data

US 2025/0008116 A1      Jan. 2, 2025

Related U.S. Application Data

(63) Continuation of application No. 17/623,416, filed as application No. PCT/KR2020/008342 on Jun. 26, 2020, now Pat. No. 12,120,320.

(30) Foreign Application Priority Data

Jun. 28, 2019      (KR) ........................ 10-2019-0078364
Nov. 28, 2019      (KR) ........................ 10-2019-0155645

(51) Int. Cl.
*H04N 19/172*      (2014.01)
*H04N 19/105*      (2014.01)
(Continued)

(52) U.S. Cl.
CPC ......... *H04N 19/172* (2014.11); *H04N 19/105* (2014.11); *H04N 19/139* (2014.11); *H04N 19/146* (2014.11); *H04N 19/30* (2014.11)

(58) Field of Classification Search
CPC ...................................................... H04N 19/70
See application file for complete search history.

(56) References Cited

U.S. PATENT DOCUMENTS

2017/0006300 A1      1/2017   Tsukuba et al.
2017/0310961 A1      10/2017  Liu et al.
(Continued)

FOREIGN PATENT DOCUMENTS

CN          106170981  A      11/2016
CN          106797229  A      5/2017
(Continued)

OTHER PUBLICATIONS

International Search Report issued for corresponding International Patent Application No. PCT/KR2020/008342 on Oct. 16, 2020, along with an English translation.
(Continued)

*Primary Examiner* — Jerry T Jean Baptiste
(74) *Attorney, Agent, or Firm* — Hauptman Ham, LLP

(57) ABSTRACT

A video decoding apparatus and a method for adaptively setting a resolution are disclosed. According to one embodiment of the present invention, a method for adaptively setting a resolution on a per-picture basis comprises the steps of: decoding maximum resolution information from a bitstream; decoding, from the bitstream, resolution information about a current picture; and setting the resolution of the current picture on the basis of the maximum resolution information or the resolution information, wherein the resolution information has a size less than or equal to that of the maximum resolution information.

5 Claims, 15 Drawing Sheets

(51) Int. Cl.
H04N 19/139 (2014.01)
H04N 19/146 (2014.01)
H04N 19/30 (2014.01)

(56) References Cited

U.S. PATENT DOCUMENTS

| | | | |
|---|---|---|---|
| 2019/0320195 A1 | 10/2019 | Lim et al. | |
| 2020/0404279 A1* | 12/2020 | Choi .................... | H04N 19/196 |

FOREIGN PATENT DOCUMENTS

| | | |
|---|---|---|
| CN | 109845258 A | 6/2019 |
| EP | 3 618 435 A1 | 3/2020 |
| KR | 10-2015-0135637 A | 12/2015 |
| KR | 10-2016-0132089 A | 11/2016 |
| KR | 10-2017-0084251 A | 7/2017 |
| KR | 10-2018-0043151 A | 4/2018 |
| WO | 2019/009504 A1 | 1/2019 |

OTHER PUBLICATIONS

Written Opinion issued for corresponding International Patent Application No. PCT/KR2020/008342 on Oct. 16, 2020.
Chinese Office Action dated Jul. 21, 2023 for corresponding Chinese Patent Application No. 202080061297.6, 18 pages.
Stephan Wenger et al., "[AHG19] On Signaling of Adaptive Resolution Change," JVET-N0052, Mar. 19-27, 2019, 11 pages, cited in NPL No. 3.
P. Chen et al., "AHG8: Integrated Specification Text for Reference Picture Resampling," JVET-O1164-v1, Jul. 3-12, 2019, 1 page, cited in NPL No. 3.
Korean Office Action issued on Jul. 24, 2025, for corresponding Korean Patent Application No. 10-2019-0155645, with its English translation, 12 pages.

* cited by examiner

METHOD FOR ADAPTIVELY SETTING RESOLUTION, AND IMAGE DECODING APPARATUS

CROSS-REFERENCE TO RELATED APPLICATION

This present application is a continuation of U.S. patent application Ser. No. 17/623,416, filed on Dec. 28, 2021, which is a national phase of PCT/KR2020/008342 filed on Jun. 26, 2020, which is based on and claims priority to Korean Patent Application No. 10-2019-0078364 filed on Jun. 28, 2019, and Korean Patent Application No. 10-2019-0155645 filed on Nov. 28, 2019, the disclosures of which are incorporated by reference herein in their entireties

BACKGROUND

(a) Field of the Disclosure

The present disclosure relates to encoding and decoding of a video, and more particularly, to a video decoding apparatus and a method for adaptively setting a resolution in which encoding and decoding efficiency is improved by adaptively setting a resolution of sequence on a per-picture basis.

(b) Related Art

Since the volume of video data typically is larger than that of voice data or still image data, storing or transmitting video data without processing for compression requires a significant amount of hardware resources including memory.

Accordingly, in storing or transmitting video data, the video data is generally compressed using an encoder so as to be stored or transmitted. Then, a decoder receives the compressed video data, and decompresses and reproduces the video data. Compression techniques for video include H.264/AVC and High Efficiency Video Coding (HEVC), which improves coding efficiency over H.264/AVC by about 40%.

However, for video data, picture size, resolution, and frame rate are gradually increasing, and accordingly the amount of data to be encoded is also increasing. Accordingly, a new compression technique having better encoding efficiency and higher image quality than the existing compression technique is required.

SUMMARY

(a) Technical Problem

The present disclosure provides an improved video encoding and decoding technology in order to meet the above needs. In particular, an aspect of the present disclosure relates to the technique of improving encoding and decoding efficiency through various methods for adaptively setting a resolution.

(b) Technical Solution

In accordance with one aspect of the present disclosure, provided is a method of adaptively setting a resolution on a per-picture basis, the method comprises decoding maximum resolution information from bitstream, decoding resolution information for a current picture from the bitstream, and setting a resolution of the current picture based on the maximum resolution information or the resolution information for the current picture. The resolution information for the current picture has a size less than or equal to the maximum resolution information.

In accordance with another aspect of the present disclosure, provided is a video decoding apparatus of adaptively setting a resolution on a per-picture basis, the apparatus comprises a decoding unit configured to decode maximum resolution information and resolution information for a current picture from bitstream, and a control unit configured to set resolution of the current picture based on the maximum resolution information or the resolution information for the current picture. The resolution information for the current picture has a size less than or equal to the maximum resolution information.

(c) Technical Effects

As described above, according to one embodiment of the present disclosure, since the resolution can be adaptively set for one sequence, a video encoding/decoding method more suitable for diversified service conditions can be provided.

Further, according to another embodiment of the present disclosure, in the case of a picture having a smooth texture, encoding and decoding can be enabled by down-sampling by 1/2.

DESCRIPTION OF EXEMPLARY EMBODIMENTS

Figure 1:
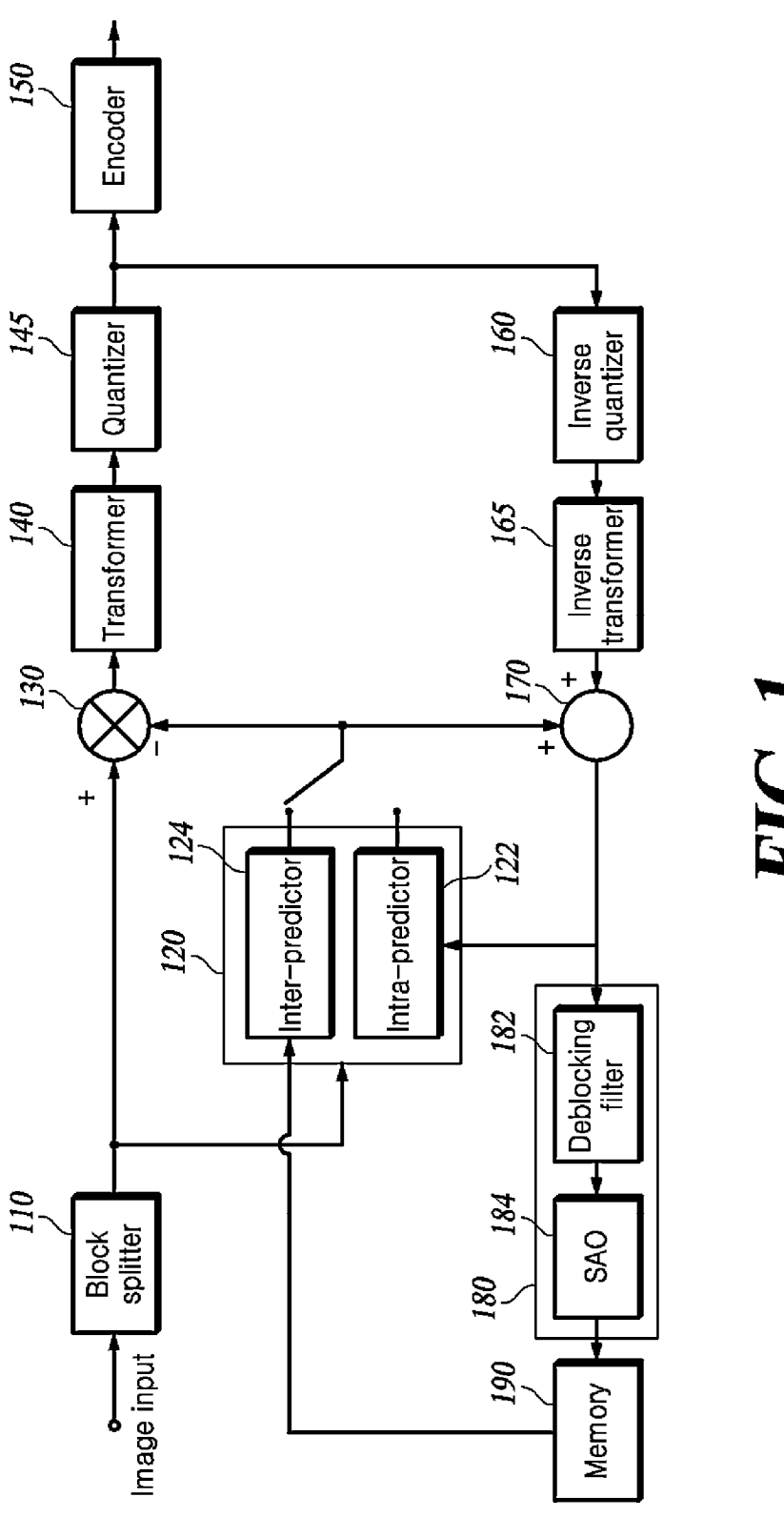
FIG. 1 is an exemplary block diagram of a video encoding apparatus capable of implementing the techniques of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a block splitter 110, a predictor 120, a subtractor 130, a transformer 140, a quantizer 145, an encoder 150, an inverse quantizer 160, an inverse transformer 165, an adder 170, a filter unit 180, and a memory 190.

Each element of the video encoding apparatus may be implemented in hardware or software, or a combination of hardware and software. The functions of the respective elements may be implemented in software, and a microprocessor may be implemented to execute the software functions corresponding to the respective elements.

One video is composed of a plurality of pictures. Each picture is split into a plurality of regions, and encoding is performed on each region. For example, one picture is split into one or more tiles and/or slices. Here, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one tile in common is encoded as a syntax of the tile or encoded as a syntax of a tile group, which is a collection of multiple tiles, and information applied to all blocks constituting one picture is encoded in a picture parameter set (PPS) or a picture header. Further, information referred to by a plurality of pictures in common is encoded in a sequence parameter set (SPS). In addition, information referred to by one or more SPSs in common is encoded in a video parameter set (VPS).

The block splitter 110 determines the size of a coding tree unit (CTU). Information about the size of the CTU (CTU size) is encoded as a syntax of the SPS or PPS and is transmitted to the video decoding apparatus.

The block splitter 110 splits each picture constituting a video into a plurality of CTUs having a predetermined size, and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) having the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QTBT (QuadTree plus Binary Tree) structure or a QTBTTT (QuadTree plus BinaryTree TernaryTree) structure may be used. Here, BTTTs may be collectively referred to as a multiple-type tree (MTT).

Figure 2:
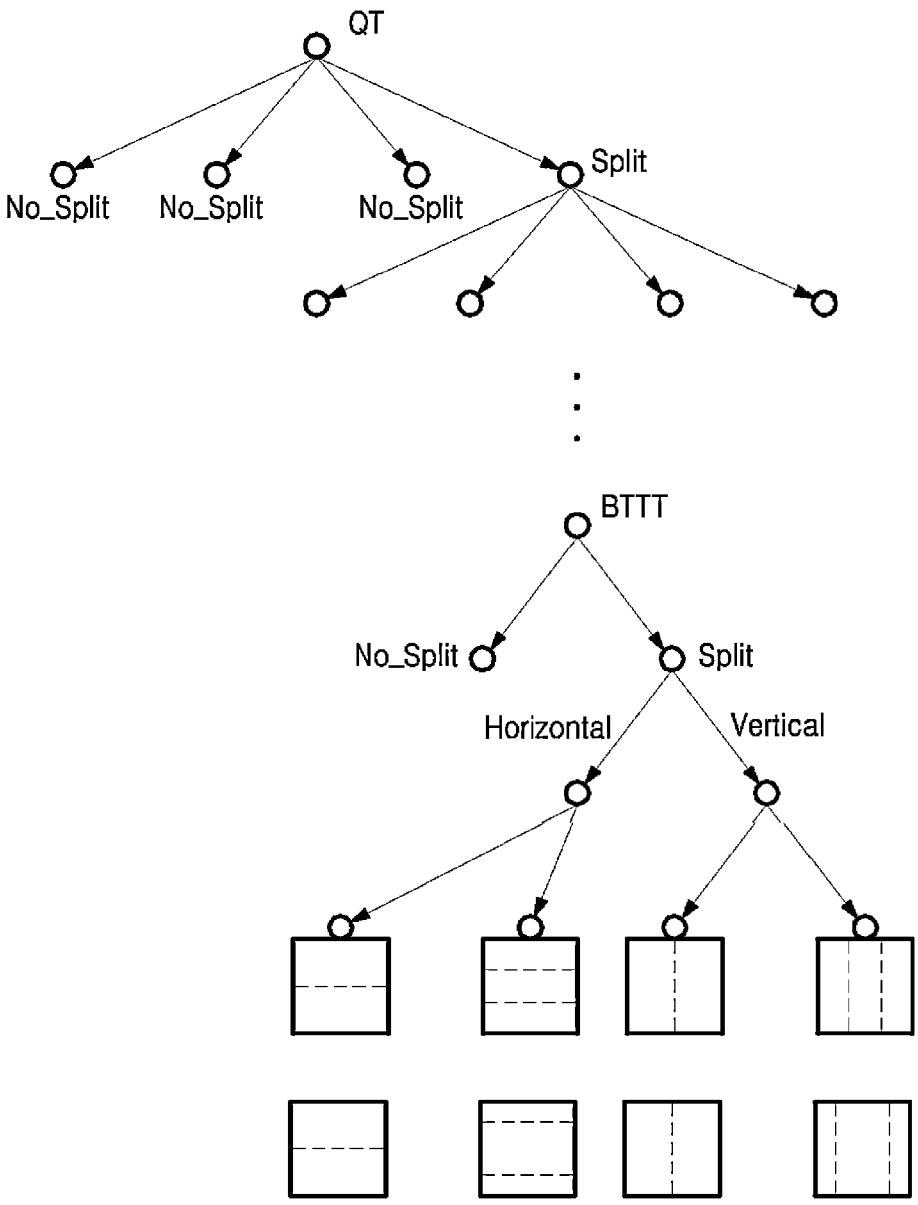
FIG. 2 exemplarily shows a block partitioning structure using a QTBTTT structure.

FIG. 2 shows a QTBTTT splitting tree structure. As shown in FIG. 2, a CTU may be initially split in the QT structure. The QT splitting may be repeated until the size of the splitting block reaches the minimum block size (MinQTSize) of a leaf node allowed in the QT. A first flag (QT_split_flag) indicating whether each node of the QT structure is split into four nodes of a lower layer is encoded and signaled to the video decoding apparatus by the encoder 150. When the leaf node of the QT is not larger than the maximum block size (MaxBTSize) of the root node allowed in BT, it may be further split in one or more of the BT structure or the TT structure. In the BT structure and/or the TT structure, there may be a plurality of splitting directions. For example, there may be two directions, which are horizontal splitting and vertical splitting of the block of the node. As shown in FIG. 2, when MTT splitting starts, a second flag (mtt_split_flag) indicating whether nodes are split, and a flag indicating a splitting direction (vertical or horizontal), and/or a flag indicating a splitting type (Binary or Ternary) are encoded and signaled to the video decoding apparatus by the encoder 150.

As another example of the tree structure, when a block is split using the QTBTTT structure, information about a CU split flag (split_cu_flag) indicating that the block has been split and a QT split flag (split_qt_flag) indicating whether the splitting type is QT splitting is encoded and signaled to the video decoding apparatus by the encoder 150. When the value of split_cu_flag indicates that the block has not been split, the block of the node becomes a leaf node in the splitting tree structure and is used as a coding unit (CU), which is a basic unit of encoding. When the value of split_cu_flag indicates that the block has not been split, whether the splitting type is QT or MTT is distinguished by the value of split_qt_flag. When the splitting type is QT, there is no additional information. When the splitting type is MTT, a flag (mtt_split_cu_vertical_flag) indicating the MTT splitting direction (vertical or horizontal) and/or a flag (mtt_split_cu_binary_flag) indicating the MTT splitting type (Binary or Ternary) are encoded and signaled to the video decoding apparatus by the encoder 150.

As another example of the tree structure, when QTBT is used, there may be two splitting types, which are horizontal splitting (i.e., symmetric horizontal splitting) and vertical splitting (i.e., symmetric vertical splitting) of a block of a node into two blocks of the same size. A split flag (split_flag) indicating whether each node of the BT structure is split into blocks of a lower layer and split type information indicating the splitting type are encoded and transmitted to the video decoding apparatus by the encoder 150. There may be an additional type, which is splitting a block of a node into two asymmetric blocks. The asymmetric splitting type may include a type of splitting a block into two rectangular blocks at a size ratio of 1:3, and a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block."

The predictor 120 predicts a current block to generate a predicted block. The predictor 120 includes an intra-predictor 122 and an inter-predictor 124.

In general, each of the current blocks in a picture may be predictively coded. Prediction of a current block may be performed using the technique of intra-prediction (which is performed based on the data from a picture containing the current block) or the technique of inter-prediction (which is performed based on the data from a picture coded before the picture containing the current block). Inter-prediction includes both uni-directional prediction and bi-directional prediction.

Figure 3:
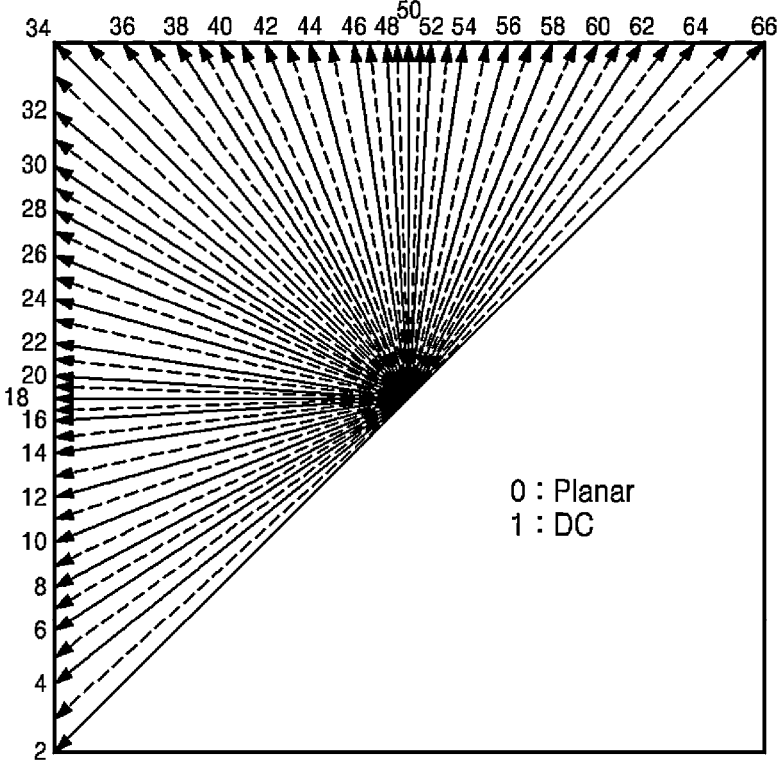
FIG. 3 exemplarily shows a plurality of intra-prediction modes.

The intra-predictor 122 predicts pixels in the current block using pixels (reference pixels) located around the current block in the current picture including the current block. There is a plurality of intra-prediction modes according to the prediction directions. For example, as shown in FIG. 3, the plurality of intra-prediction modes may include non-directional modes, which include a planar mode and a DC mode, and 65 directional modes. Neighboring pixels and an equation to be used are defined differently for each prediction mode.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes, and may select an intra-prediction mode that has the best rate distortion characteristics among the tested modes.

The intra-predictor 122 selects one intra-prediction mode from among the plurality of intra-prediction modes, and predicts the current block using neighboring pixels (reference pixel) and an equation determined according to the selected intra-prediction mode. Information about the selected intra-prediction mode is encoded by the encoder 150 and transmitted to the video decoding apparatus.

The inter-predictor 124 generates a predicted block for the current block through a motion compensation process. The inter-predictor searches for a block most similar to the current block in a reference picture encoded and decoded earlier than the current picture, and generates a predicted block for the current block based on the searched block. Then, the inter-predictor generates a motion vector corresponding to a displacement between the current block in the current picture and the predicted block in the reference picture. In general, motion estimation is performed on a luma component, and a motion vector calculated based on the luma component is used for both the luma component and the chroma component. Motion information including information on the reference picture used to predict the current block and information on the motion vector is encoded and transmitted to the video decoding apparatus by the encoder 150.

The subtractor 130 generates a residual block by subtracting the predicted block generated by the intra-predictor 122 or the inter-predictor 124 from the current block.

The transformer 140 transforms a residual signal in a residual block having pixel values in the spatial domain into a transform coefficient in the frequency domain. The transformer 140 may transform the residual signals in the residual block using the total size of the current block as a transformation unit. Alternatively, the transformer may split the residual block into sub-blocks of a transform region and non-transform region, and transform the residual signals using only the sub-block of the transform region as a transformation unit. Here, the transform region sub-block may be one of two rectangular blocks having a size ratio of 1:1 based on the horizontal axis (or vertical axis). In this case, a flag (cu_sbt_flag) indicating that only the subblock has been transformed, directional (vertical/horizontal) information (cu_sbt_horizontal_flag), and/or location information (cu_sbt_pos_flag) are encoded and signaled to the video decoding apparatus by the encoder 150. In addition, the size of the transform region sub-block may have a size ratio of 1:3 based on the horizontal axis (or vertical axis). In this case, a flag (cu_sbt_quad_flag) for distinguishing the splitting is additionally encoded signaled to the video decoding apparatus by the encoder 150.

The quantizer 145 quantizes transform coefficients output from the transformer 140, and outputs the quantized transform coefficients to the encoder 150.

The encoder 150 generates a bitstream by encoding the quantized transform coefficients using an encoding method such as Context-based Adaptive Binary Arithmetic Code (CABAC). The encoder 150 encodes information such as the CTU size, CU split flag, QT split flag, MTT splitting direction, and MTT splitting type related to block splitting, such that the video decoding apparatus splits the block in the same manner as the video encoding apparatus.

Further, the encoder 150 encodes information about a prediction type indicating whether the current block is encoded by intra-prediction or by inter-prediction, and encodes intra-prediction information (i.e., information about an intra-prediction mode) or inter-prediction information (information about a reference picture and a motion vector) according to the prediction type.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the predicted block generated by the predictor 120 to reconstruct the current block. The pixels within the reconstructed current block are used as reference pixels for intra-prediction of the next block.

The filter unit 180 filters the reconstructed pixels to reduce blocking artifacts, ringing artifacts, and blurring artifacts generated due to block-based prediction and transformation/quantization. The filter unit 180 may include a deblocking filter 182 and a sample adaptive offset (SAO) filter 184.

The deblocking filter 180 filters the boundary between the reconstructed blocks to remove blocking artifacts caused by block-by-block encoding/decoding, and the SAO filter 184 additionally filters the deblocking filtered video. The SAO filter 184 is a filter used to compensate for a difference between a reconstructed pixel and an original pixel caused by lossy coding.

The reconstructed blocks filtered through the deblocking filter 182 and the SAO filter 184 are stored in the memory 190. Once all blocks in one picture are reconstructed, the reconstructed picture is used as a reference picture for inter-prediction of blocks in the next picture to be encoded.

Although not shown in FIG. 1, the video encoding apparatus may further include a control unit configured to set the resolution on a per-picture basis and perform scaling or resampling. This control unit may be implemented in the same physical configuration (such as a processor) together with the sub-components as shown in FIG. 1, or may be implemented in a physical configuration different from the sub-components shown in FIG. 1. Details of the control unit will be described later.

Figure 4:
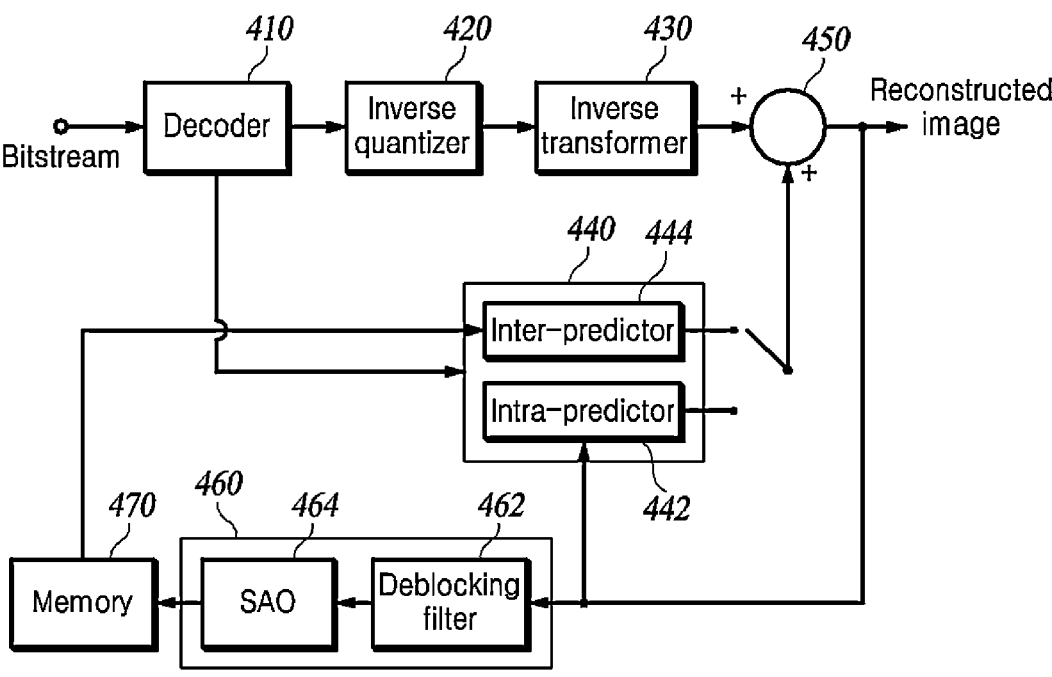
FIG. 4 is an exemplary block diagram of a video decoding apparatus capable of implementing the techniques of the present disclosure.

FIG. 4 is an exemplary functional block diagram of a video decoding apparatus capable of implementing the techniques of the present disclosure. Hereinafter, the video decoding apparatus and elements of the apparatus will be described with reference to FIG. 4.

The video decoding apparatus may include a decoder 410, an inverse quantizer 420, an inverse transformer 430, a predictor 440, an adder 450, a filter unit 460, and a memory 470.

Similar to the video encoding apparatus of FIG. 1, each element of the video decoding apparatus may be implemented as hardware or software, or may be implemented as a combination of hardware and software. In addition, the function of each element may be implemented as software, and a microprocessor may be implemented to execute the functions of software corresponding to each element.

The decoder 410 determines a current block to be decoded by decoding the bitstream received from the video encoding apparatus and extracting information related to block splitting, and extracts prediction information and information on residual signals necessary to reconstruct the current block.

The decoder 410 extracts information about the CTU size from the sequence parameter set (SPS) or the picture parameter set (PPS), determines the size of the CTU, and splits a picture into CTUs of the determined size. Then, the decoder determines the CTU as the uppermost layer, that is, the root node of a tree structure, and extracts splitting information about the CTU to split the CTU using the tree structure.

For example, when the CTU is split using the QTBTTT structure, a first flag (QT_split_flag) related to QT splitting is first extracted and each node is split into four nodes of a lower layer. Then, for a node corresponding to the leaf node of QT, a second flag (MTT_split_flag) related to MTT splitting and information on the splitting direction (vertical/horizontal) and/or splitting type (binary/ternary) are extracted, and the leaf node is split in the MTT structure. In this way, each node below the leaf node of the QT is recursively split in a BT or TT structure.

As another example, when a CTU is split using the QTBTTT structure, a CU split flag (split_cu_flag) indicating whether a CU is split is first extracted. If the corresponding block is split, a QT split flag (split_qt_flag) is extracted. When the splitting type is not QT but MTT, a flag (mtt_split_cu_vertical_flag) indicating the MTT splitting direction (vertical or horizontal) and/or a flag (mtt_split_cu_binary_flag) indicating the MTT splitting type (Binary or Ternary) is additionally extracted. In the splitting process, each node may be subjected to recursive QT splitting zero or more times, and then subjected to recursive MTT splitting zero or more times. For example, the CTU may be MTT-split immediately, or may only be QT-split multiple times.

As another example, when the CTU is split using the QTBT structure, the first flag (QT_split_flag) related to the QT spitting, and each node is split into four nodes of a lower layer. For a node corresponding to the leaf node of the QT, the split_flag indicating whether the node is further BT-split and splitting direction information are extracted.

Upon determining the current block to be decoded through tree structure splitting, the decoder 410 extracts information about a prediction type indicating whether the current block is subjected to intra-prediction or inter-prediction. When the prediction type information indicates intra-prediction, the decoder 410 extracts a syntax element for the intra-prediction information (intra-prediction mode) for the current block. When the prediction type information indicates inter-prediction, the decoder 410 extracts a syntax element for the inter-prediction information, that is, information indicating a motion vector and a reference picture referred to by the motion vector.

The decoder 410 extracts information about quantized transform coefficients of the current block as information about residual signals.

The inverse quantizer 420 inversely quantizes the quantized transform coefficients, and inversely transforms the inversely quantized transform coefficients from the frequency domain to the spatial domain to reconstruct residual signals to generate a residual block for the current block.

In addition, when the inverse transformer 430 inversely transforms only a partial region (sub-block) of a transform block, a flag (cu_sbt_flag) indicating that only a sub-block of the transform block has been transformed, and the direction information (vertical/horizontal) about the sub-block (cu_sbt_horizontal_flag) and/or sub-block location information (cu_sbt pos_flag) are extracted. Then, residual signals are reconstructed by inversely transforming the transform coefficients of the sub-block from the frequency domain to the spatial domain. For the region that is not inversely transformed, the residual signal is filled with "0". Thereby, the final residual block for the current block is created.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 determines an intra-prediction mode of the current block among a plurality of intra-prediction modes based on a syntax element for the intra-prediction mode extracted from the decoder 410, and predicts the current block based on the reference pixels around the current block according to the intra-prediction mode.

The inter-predictor 444 determines a motion vector of the current block and a reference picture referenced by the motion vector based on the syntax element for the intra-prediction mode extracted from the decoder 410, and predicts the current block based on the motion vector and the reference picture.

The adder 450 reconstructs the current block by adding the residual block output from the inverse transformer and the predicted block output from the inter-predictor or the intra-predictor. The pixels in the reconstructed current block are used as reference pixels for intra-prediction of a block to be decoded later.

The filter unit 460 may include a deblocking filter 462 and an SAO filter 464. The deblocking filter 462 performs deblocking filtering on the boundary between reconstructed blocks to remove blocking artifacts caused by block-by-block decoding. The SAO filter 464 performs additional filtering on a reconstructed block after deblocking filtering in order to compensate for a difference between the reconstructed pixel and the original pixel caused by lossy coding. The reconstructed block filtered through the deblocking filter 462 and the SAO filter 464 is stored in the memory 470. When all blocks in one picture are reconstructed, the reconstructed picture is used as a reference picture for inter-prediction of a block in a picture to be encoded thereafter.

Although not shown in FIG. 4, the video decoding apparatus may further include a control unit for setting the resolution on a per-picture basis and performing scaling or resampling. This control unit may be implemented in the same physical configuration (such as a processor) together with the sub-components as shown in FIG. 4, or may be implemented in a physical configuration different from the sub-components shown in FIG. 4. Details of the control unit will be described later.

Meanwhile, the control unit included in the video decoding apparatus is a component corresponding to the above-described control unit included in the video encoding apparatus in terms of its function. Hereinafter, for the purpose of simply distinguishing the control unit included in the video decoding apparatus and the control unit included in the video encoding apparatus, the control unit included in the video decoding apparatus will be referred to as "decoding control unit", and the control unit included in the video encoding apparatus will be referred to as "encoding control unit".

In the HEVC standard, resolution information of a sequence is recorded and signaled in a sequence parameter set (SPS). That is, the resolution information of the sequence is set on a per-sequence basis (i.e., one resolution information for one sequence).

As shown in Table 1, the resolution information of the sequence is described in terms of a picture width (pic_width_in_luma_samples) and a picture height (pic_height_in_luma_samples) on the basis of luma samples.

TABLE 1

| | Descriptor |
|---|---|
| seq_parameter_set_rbsp( ) { | |
| ... | |
| pic_width_in_luma_samples | ue(v) |
| pic_height_in_luma_samples | ue(v) |
| ... | |
| } | |

Such a conventional method does not suitable for a service situation requiring various resolutions since one resolution is set or designated for one sequence.

The present disclosure proposes methods for solving the above problem by adaptively setting the resolution in the units of sub-units included in one sequence. The sub-unit in which the resolution is set may be a picture, a slice, or a tile group included in one sequence. In this specification, the proposed methods will be described focusing on an embodiment in which resolution is set on a per-picture basis.

Picture Type

The picture type for which the resolution is set may be divided into four types, such as an original picture, a decoded picture, a reference picture, and an output picture.

The original picture may refer to a picture to be encoded by the video encoding apparatus. The resolution of the original picture may be the maximum resolution that corresponding sequences can have. Accordingly, the information on the resolution of the original picture may be the maximum (max) resolution information. Also, the maximum resolution information may be the maximum resolution that a decoded picture can have.

Figure 5:
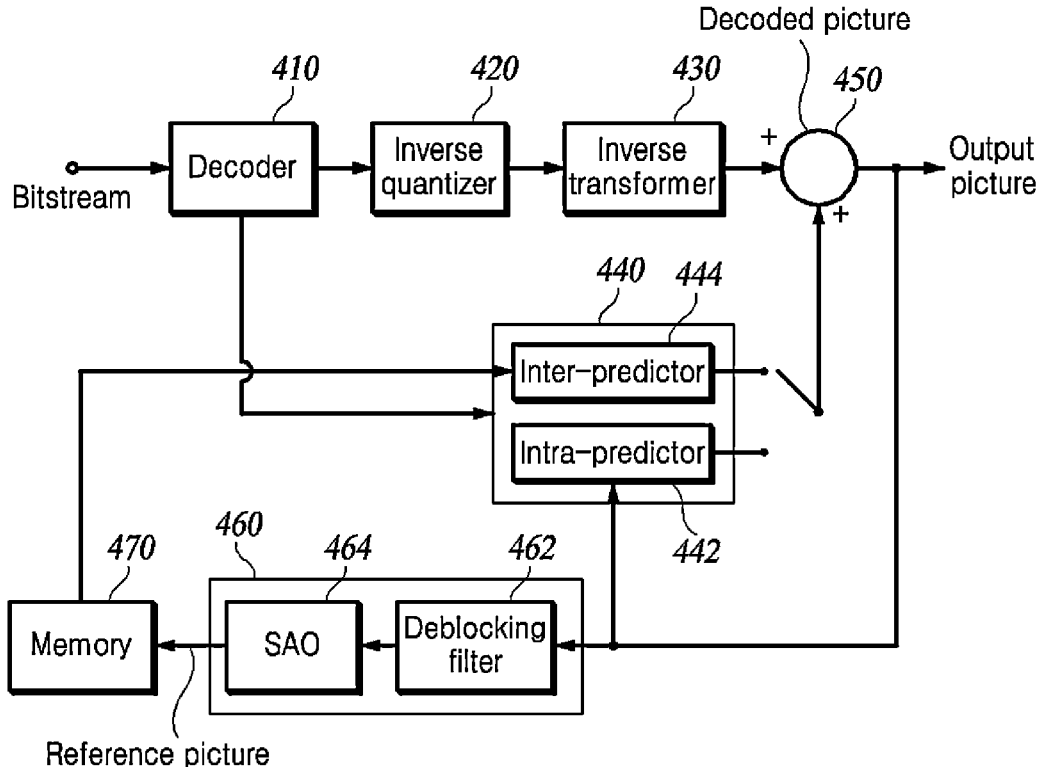
FIG. 5 is a diagram for describing various picture types.
Figure 6:
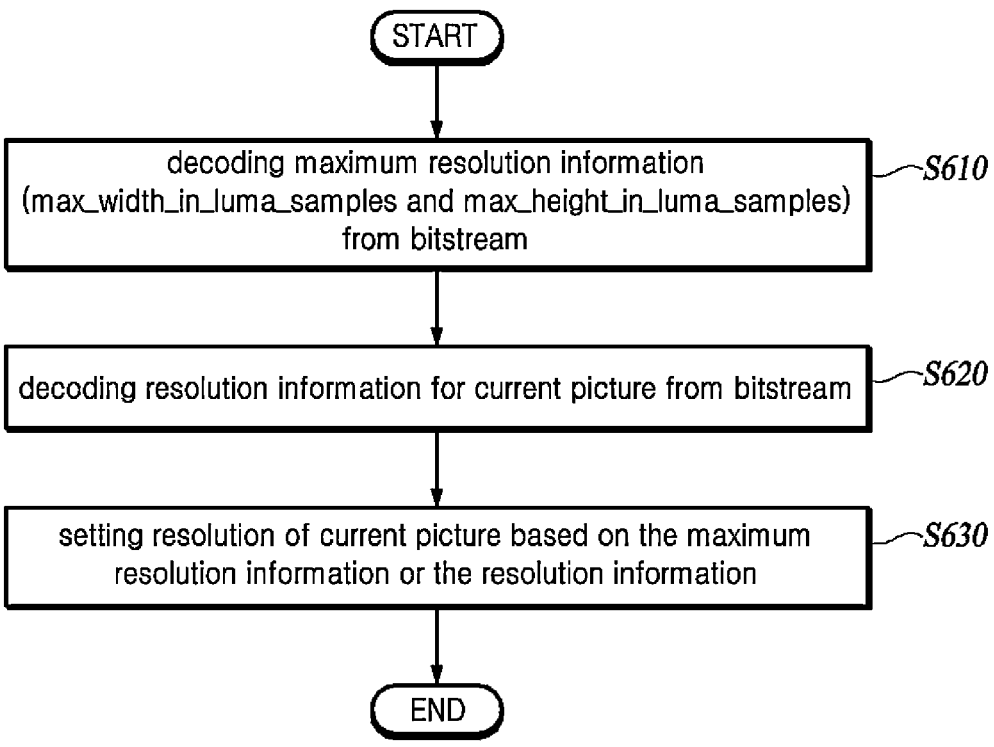
FIG. 6 is a flowchart for explaining one embodiment of the present disclosure.
Figure 7:
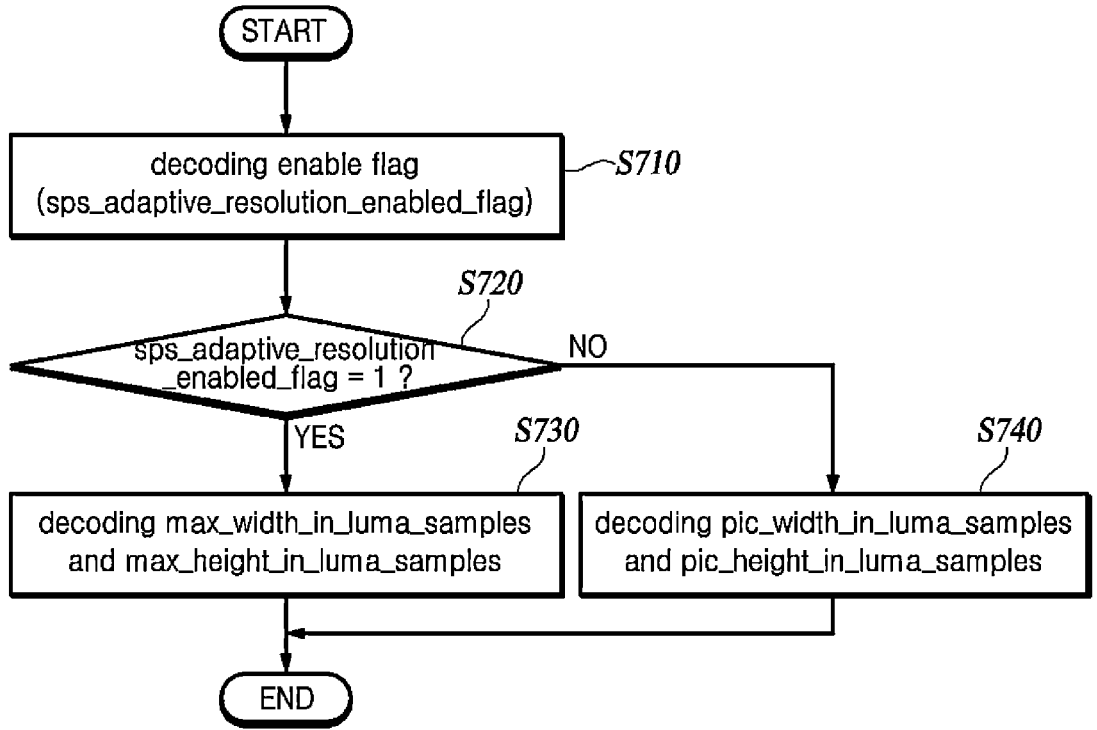
FIGS. 7 to 10 are flowcharts for explaining various embodiments of the present disclosure.
Figure 8:
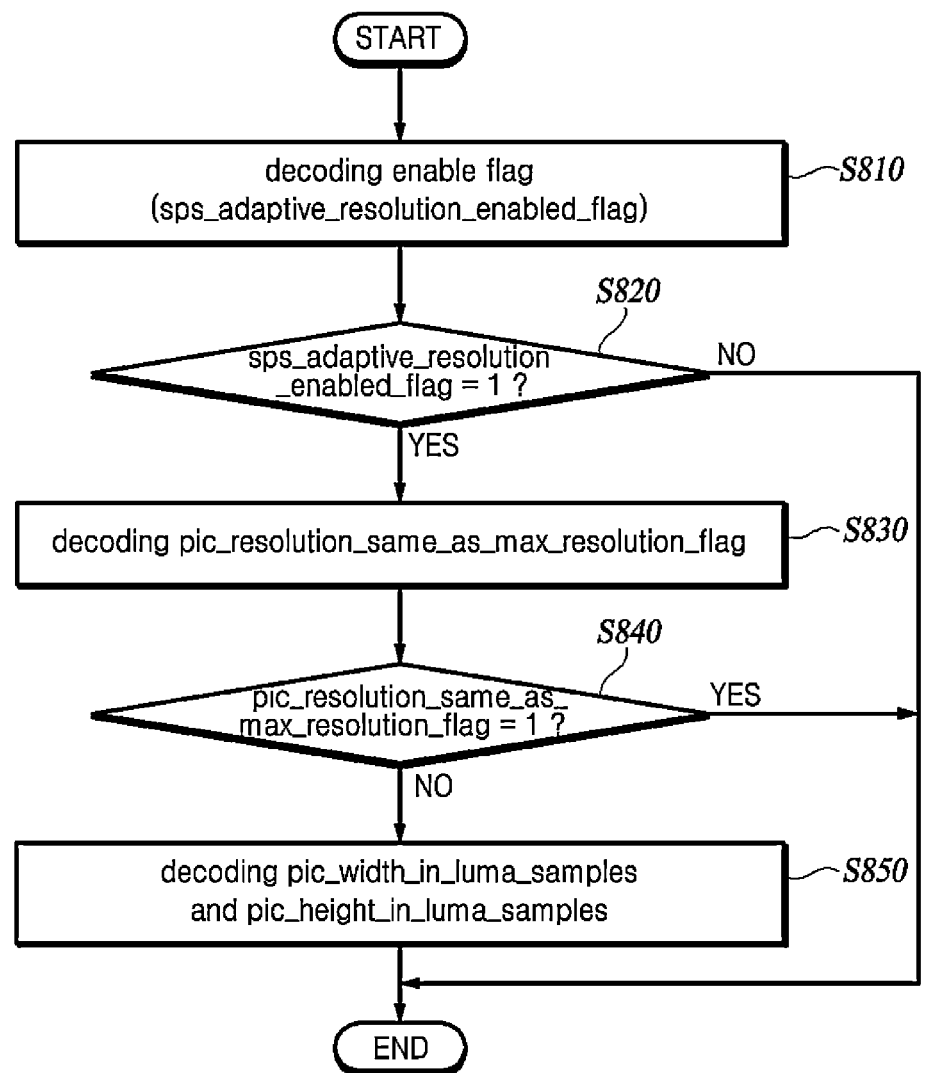
Figure 9:
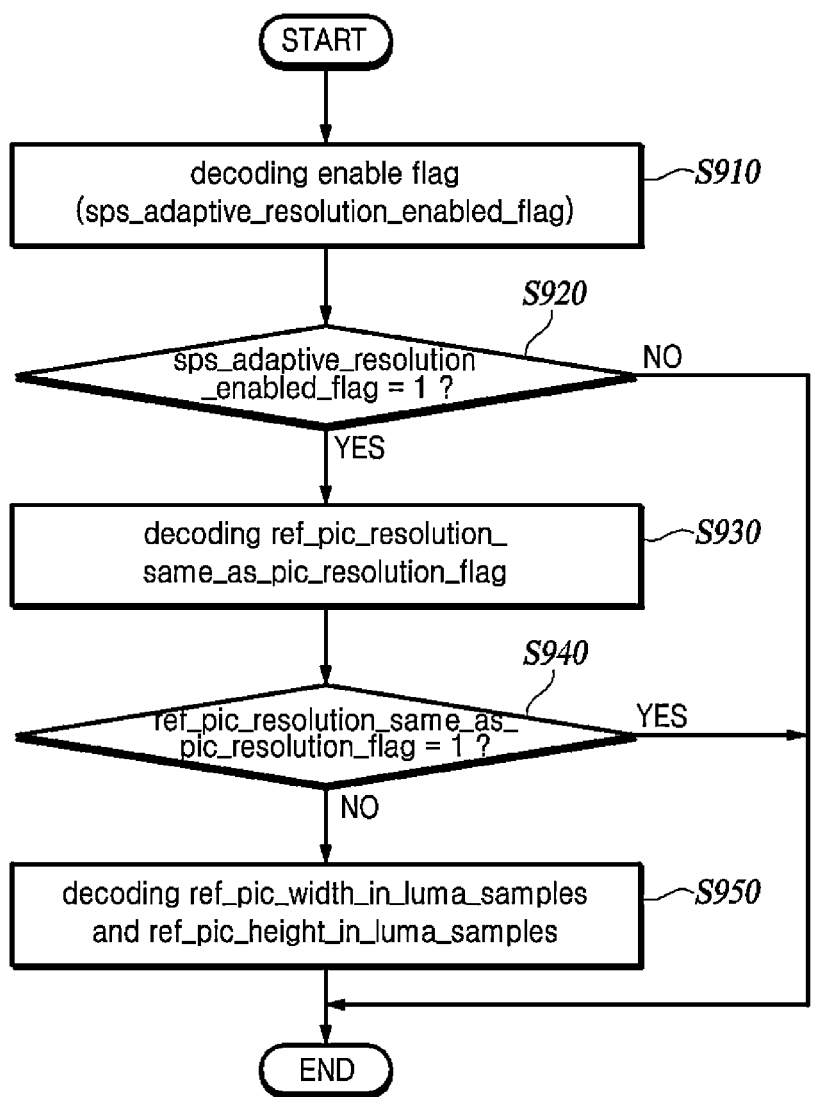
Figure 10:
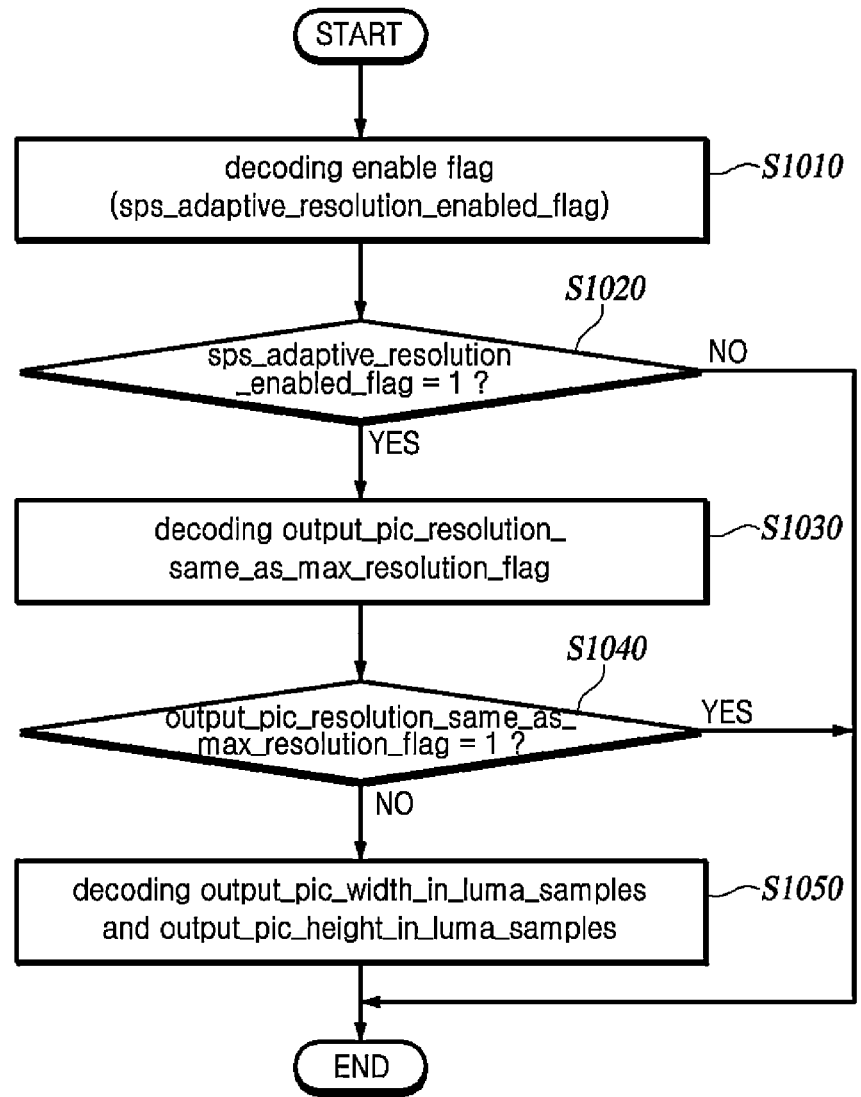
Figure 11:
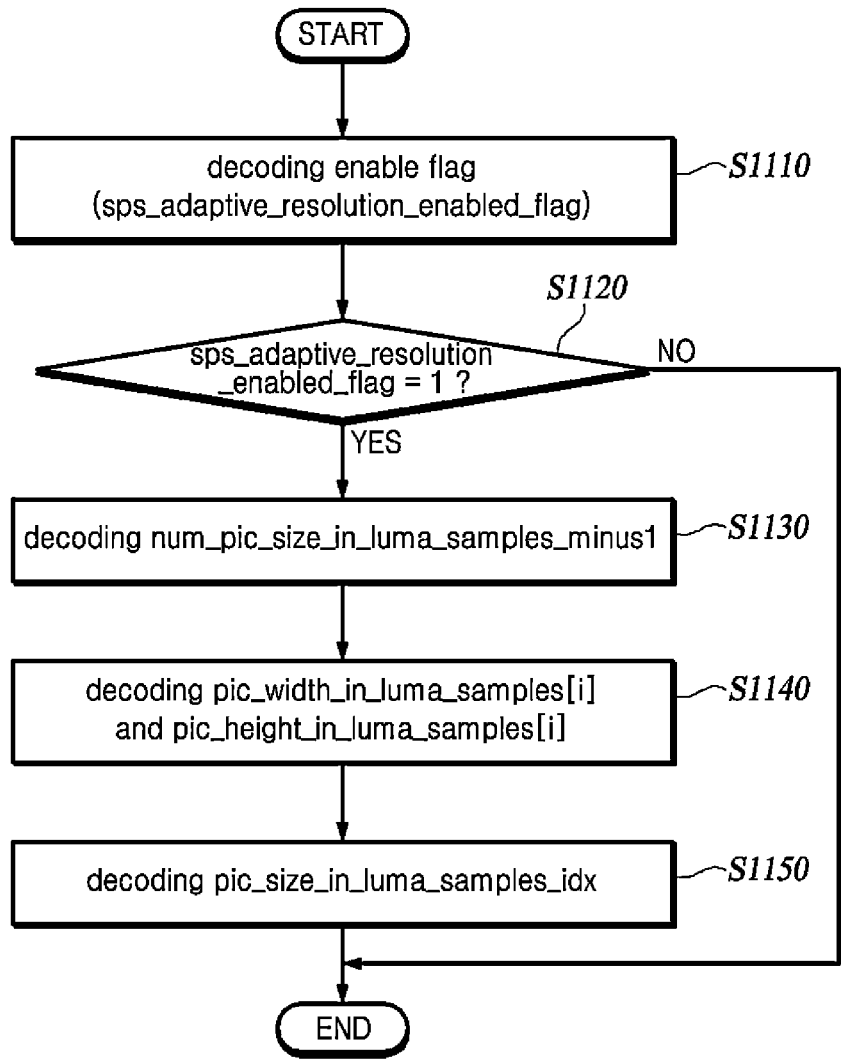
FIGS. 11 to 13 are flowcharts for explaining various embodiments of the present disclosure using candidate resolutions.
Figure 12:
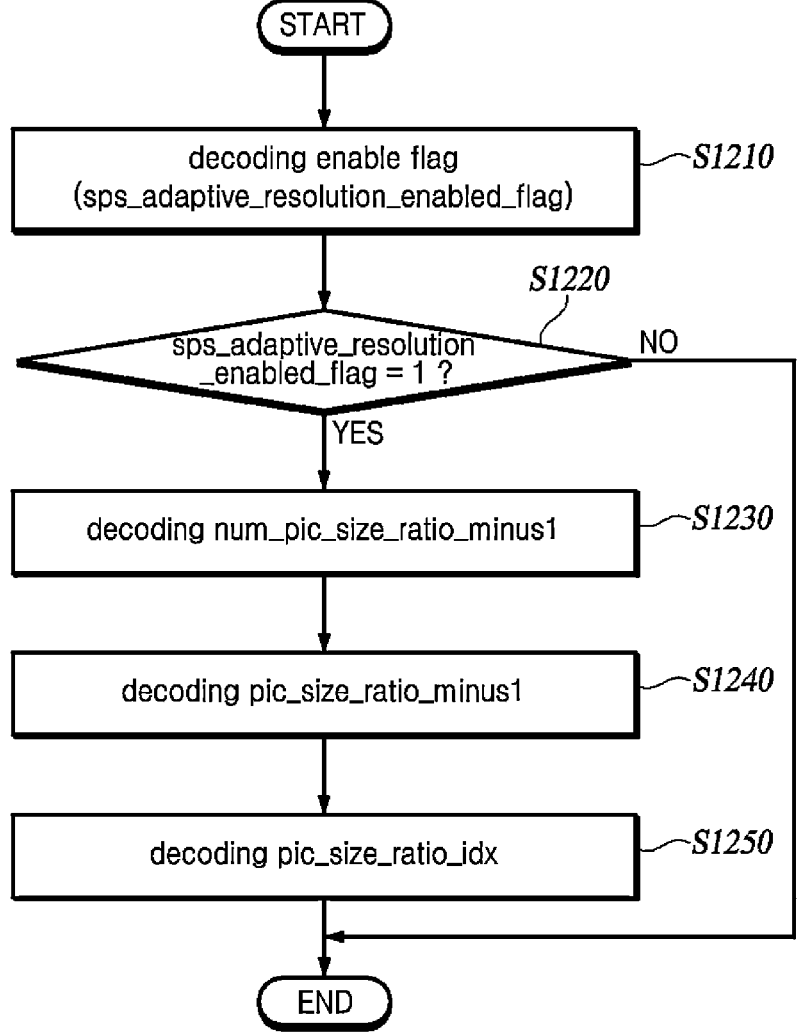

The decoded picture, the reference picture, and the output picture may be classified according to a decoding process, and a diagram for describing these pictures is shown in FIG. 5.

The decoded picture may be a result of applying the decoding process to a current picture corresponding to a target picture to be reconstructed. That is, the decoded picture may be a reconstructed current picture. The reference picture may be a decoded picture stored in a buffer or a memory 470 for use of prediction of pictures (next pictures) to be reconstructed after the current picture. The output picture may be a decoded picture output from the video decoding apparatus for output or display of the picture.

For example, when the current picture is the t-th picture, the resolution information used in the process of decoding the current picture may be the resolution information of the decoded picture. The resolution information of the reference picture may indicate a resolution at which a reconstructed picture of the current picture is stored in the buffer to be used as a reference picture for a subsequent picture (e.g., (t+1)-th picture) after the current picture is reconstructed. Next, when the current picture is the (t+1)-th picture, resolution information of the current picture may be the resolution information of the decoded picture. In this case, if the t-th picture is used as a reference picture in inter prediction, the resolution information of the (t+1)-th decoded picture and the resolution information of the t-th reference picture are compared with each other. r. Also, in the case of outputting the t-th picture stored in the buffer, the resolution information of the t-th reference picture and the resolution information of the t-th output picture are compared with each other.

An example of the present disclosure in which a resolution is set on the basis of the picture type as described above will be described below.

The video encoding apparatus (more specifically, the encoding control unit) may set the resolution. The resolution to be set may include maximum resolution information, and resolution information for the current picture. Here, the resolution information for the current picture may mean resolution for a decoded picture, a reference picture, and an output picture, and the resolution may be set on a per-picture basis.

The video encoding apparatus may encode the maximum resolution information and signal it to the video decoding apparatus. The video decoding apparatus may decode the maximum resolution information from the bitstream (S610).

The maximum resolution information may be defined and signaled in the SPS of the bitstream. The maximum resolution information may be expressed as max_width_in_luma_samples and max_height_in_luma_samples, or may be expressed as pic_width_max_in_luma_samples and pic_height_max_in_luma_samples.

The video encoding apparatus may encode the resolution information for the current picture and signal it to the video decoding apparatus. The video decoding apparatus may decode the resolution information for the current picture from the bitstream (S620).

The resolution information for the current picture may be defined and signaled in at least one of a picture parameter set (PPS), a picture-level header, a slice header, and a tile group header of the bitstream. Since the maximum resolution information is the maximum resolution that the current picture can have, the resolution information for the current picture may have a size or a value less than or equal to the maximum resolution information.

The resolution information for the current picture may include resolution information for one or more of picture types. Specifically, the resolution information may include at least one of resolution information (pic_width_in_luma_samples and pic_height_in_luma_samples) of a decoded picture, which is resolution information when the current picture has been reconstructed, and resolution information (ref_pic_width_in_luma_samples) of a reference picture, which is resolution information when the decoded picture is stored for use of prediction of the next picture, and (ref_pic_height_in_luma_samples) and resolution information of an output picture (output_pic_width_in_luma_samples and output_pic_height_in_luma_samples), which is resolution information when the decoded picture is output.

The video decoding apparatus (more specifically, the decoding control unit) may set the resolution of the current picture (at least one of the reconstructed picture, the reference picture, and the output picture) based on the maximum resolution information or the resolution information for the current picture (S630).

According to one embodiment, the method of adaptively setting the resolution proposed by the present disclosure may be implemented in a separate mode (so-called adaptive resolution setting mode). Whether the adaptive resolution setting mode is enabled/disabled may be determined using an enable flag (e.g., adaptive_resolution_enabled_flag or ref_pic_resampling_enabled_flag).

If adaptive_resolution_enabled_flag=1 or ref_pic_resampling_enabled_flag=1, the adaptive resolution setting mode may be enabled, and if adaptive_resolution_enabled_flag=0 or ref_pic_resampling_enabled_flag=0, the adaptive resolution setting mode may be disabled.

ref_pic_resampling_enabled_flag=1 may indicate that since the adaptive resolution setting mode is enabled, the resolution between the current picture and the reference picture may be different, so scaling/resampling of the reference picture on the basis of the current picture is required (scaling or resampling is applied). Conversely, in ref_pic_resampling_enabled_flag=0, the adaptive resolution setting mode is disabled and the resolution between the current picture and the reference picture is the same, so scaling/resampling of the reference picture based on the current picture is not required (scaling or resampling is not applied). In other words, if ref_pic_resampling_enabled_flag=0, the resolution information for the current picture may be the same as the maximum resolution information. The enable flag may be defined and signaled in the SPS (sps_adaptive_resolution_enabled_flag).

Example 1

Example 1 is directed to a method of setting a resolution by explicitly signaling all of the maximum resolution information, the resolution information of the decoded picture, the resolution information of the reference picture, and the resolution information of the output picture.

Maximum Resolution Information

The video encoding apparatus may signal the maximum resolution information (max_width_in_luma_samples and max_height_in_luma_samples, alternatively, pic_width_max_in_luma_samples and pic_height_max_in_luma_samples) together with the enable flag (adaptive_resolution_enabled_flag or ref_pic_resampling_enabled_flag) (see Table 2). In addition, the maximum resolution information may be signaled when the enable flag indicates activation (i.e., adaptive_resolution_enabled_flag=1 or ref_pic_resampling_enabled_flag=1) (see Table 3).

TABLE 2

|  | Descriptor |
| --- | --- |
| seq_parameter_set_rbsp( ) { | |
| ... | |
|    max_width_in_luma_samples | ue(v) |
|    max_height_in_luma_samples | ue(v) |
|    sps_adaptive_resolution_enabled_flag | u(1) |
|    ... | |
| } | |

TABLE 3

|  | Descriptor |
| --- | --- |
| seq_parameter_set_rbsp( ) { | |
|    ... | |
|    sps_adaptive_resolution_enabled_flag | u(1) |
|    if ( sps_adaptive_resolution_enabled_flag ) { | |
|      max_width_in_luma_samples | ue(v) |
|      max_height_in_luma_samples | ue(v) |
|    } else { | |
|      pic_width_in_luma_samples | ue(v) |
|      pic_height_in_luma_samples | ue(v) |
|    } | |
| } | |

In Table 3, pic_width_in_luma_samples and pic_height_in_luma_samples, signaled in case of sps_adaptive_resolution_enabled_flag=0 or ref_pic_resampling_enabled_flag=0, represent resolution information which is set on a per-sequence basis as in the conventional method.

In the case shown in Table 2, the video decoding apparatus decodes sps_adaptive_resolution_enabled_flag (or ref_pic_resampling_enabled_flag) and maximum resolution information (i.e., max_width_in_luma_samples and max_height_in_luma_samples) from the bitstream, and utilizes max_width_in_luma_samples and max_height_in_luma_samples in setting the resolution of the current picture in case of sps_adaptive_resolution_enabled_flag=1 or ref_pic_resampling_enabled_flag=1.

In the instance of Table 3, the video decoding apparatus may decode sps_adaptive_resolution_enabled_flag (or ref_pic_resampling_enabled_flag) from the bitstream (S710). max_width_in_luma_samples and max_height_in_luma_samples may be decoded from the bitstream in case of sps_adaptive_resolution_enabled_flag=1 (or ref_pic_resampling_enabled_flag=1) (S720).

In case of sps_adaptive_resolution_enabled_flag=0 (or ref_pic_resampling_enabled_flag=0) (S720), resolution information (i.e., pic_width_in_luma_samples and pic_height_in_luma_samples) set on a per-sequence basis may be decoded from the bitstream (S740).

Resolution Information of the Decoded Picture

The video encoding apparatus signals the resolution information (pic_width_in_luma_samples and pic_height_in_luma_samples) of the decoded picture when sps_adaptive_resolution_enabled_flag equals to 1 (or ref_pic_resampling_enabled_flag equals to=1) (Table 4), alternatively, the video encoding apparatus signals the resolution information when sps_adaptive_resolution_enabled_flag equals to 1 (or ref_pic_resampling_enabled_flag=1) and the resolution of the decoded picture is different from the maximum resolution (Table 5).

TABLE 4

|  | Descriptor |
| --- | --- |
| pic_parameter_set_rbsp( ) { | |
|    if ( sps_adaptive_resolution_enabled_flag ) { | |
|      pic_width_in_luma_samples | ue(v) |
|      pic_height_in_luma_samples | ue(v) |
|    } | |
| } | |

TABLE 5

|  | Descriptor |
| --- | --- |
| pic_parameter_set_rbsp( ) { | |
|    if ( sps_adaptive_resolution_enabled_flag ) { | |
|      pic_resolution_same_as_max_resolution_flag | u(1) |
|      if ( !pic_resolution_same_as_max_resolution_flag ) { | |
|        pic_width_in_luma_samples | ue(v) |
|        pic_height_in_luma_samples | ue(v) |
|      } | |
|    } | |
| } | |

In Table 5, pic_resolution_same_as_max_resolution_flag is a flag (a "same flag") indicating whether the resolution of a decoded picture is equal to the maximum resolution. pic_resolution_same_as_max_resolution_flag=1 indicates that the resolution of the decoded picture is equal to the maximum resolution, and pic_resolution_same_as_max_resolution_flag=0 indicates that the resolution of the decoded picture is different from the maximum resolution.

As shown in Table 4, in case of sps_adaptive_resolution_enabled_flag=1 (or ref_pic_resampling_enabled_flag=1), the video decoding apparatus may decode the resolution information of the decoded picture from the bitstream. In this case, the resolution of the decoded picture may be set based on the resolution information of the decoded picture. On the other hand, if sps_adaptive_resolution_enabled_flag=0 (or ref_pic_resampling_enabled_flag=0), the adaptive resolution setting mode is disabled, so that the resolution of the decoded picture may be set on a per-sequence basis as in the conventional method.

In the instance of Table 5, the video decoding apparatus may decode sps_adaptive_resolution_enabled_flag (or ref_pic_resampling_enabled_flag) from the bitstream (S810). In case of sps_adaptive_resolution_enabled_flag=1 (or ref_pic_resampling_enabled_flag=1) (S820), pic_resolution_same_as_max_resolution_flag may be decoded from the bitstream (S830), and in case of pic_resolution_same_as_max_resolution_flag=0, resolution information from the bitstream may be decoded (S850). In this case, the resolution of the decoded picture may be set based on the resolution information of the decoded picture.

If sps_adaptive_resolution_enabled_flag=0 or ref_pic_resampling_enabled_flag=0 (S820), the adaptive resolution setting mode is disabled, so that the resolution of the decoded picture may be set on a per-sequence basis as in the conventional method. If pic_resolution_same_as_max_resolution_flag=1 (S840), since resolution information of the decoded picture is not decoded, the resolution of the decoded picture may be set based on the maximum resolution information.

Resolution Information of the Reference Picture

The video encoding apparatus may signal the resolution information (i.e., ref_pic_width_in_luma_samples and ref_pic_height_in_luma_samples) of the reference picture in case of sps_adaptive_resolution_enabled_flag=1 (or ref_pic_resampling_enabled_flag=1) (Table 6), alternatively, the video encoding apparatus may signal the resolution information when sps_adaptive_resolution_enabled_flag equals to 1 (or ref_pic_resampling_enabled_flag equals to 1) and the resolution of the reference picture is different from the maximum resolution or the resolution of the decoded picture (Table 7).

TABLE 6

| | Descriptor |
|---|---|
| pic_parameter_set_rbsp( ) { | |
|   if ( sps_adaptive_resolution_enabled_flag ) { | |
|     ref_pic_width_in_luma_samples | ue(v) |
|     ref_pic_height_in_luma_samples | ue(v) |
|   } | |
| } | |

TABLE 7

| | Descriptor |
|---|---|
| pic_parameter_set_rbsp( ) { | |
|   if ( sps_adaptive_resolution_enabled_flag ) { | |

TABLE 7-continued

| | Descriptor |
|---|---|
|     ref_pic_resolution_same_as_pic_resolution_flag | u(1) |
|     if ( !pic_resolution_same_as_pic_resolution_flag ) { | |
|       ref_pic_width_in_luma_samples | ue(v) |
|       ref_pic_height_in_luma_samples | ue(v) |
|     } | |
|   } | |
| } | |

In Table 7, ref_pic_resolution_same_as_pic_resolution_flag is a flag (a "same flag") indicating whether the resolution of the reference picture is equal to the resolution of the decoded picture. ref_pic_resolution_same_as_pic_resolution_flag=1 indicates that the resolution of the reference picture is the same as the resolution of the decoded picture, and ref_pic_resolution_same_as_pic_resolution_flag=0 indicates that the resolution of the reference picture is different from the resolution of the decoded picture.

As shown in Table 6, in case of sps_adaptive_resolution_enabled_flag=1 (or ref_pic_resampling_enabled_flag=1), the video decoding apparatus may decode the resolution information of the reference picture from the bitstream. In this case, the resolution of the decoded picture may be set based on the resolution information of the reference picture. On the other hand, if sps_adaptive_resolution_enabled_flag=0 (or ref_pic_resampling_enabled_flag=0), the resolution of the reference picture may be set on a per-sequence basis as in the conventional method.

In the instance of Table 7, the video decoding apparatus may decode sps_adaptive_resolution_enabled_flag (or ref_pic_resampling_enabled_flag) from the bitstream (S910). In case of sps_adaptive_resolution_enabled_flag=1 (or ref_pic_resampling_enabled_flag=1) (S920), ref_pic_resolution_same_as_pic_resolution_flag may be decoded from the bitstream (S930), and in case of ref_pic_resolution_same_as_pic_resolution_flag=0 (S940), the resolution information of the reference picture may be decoded from the bitstream (S950). In this case, the resolution of the reference picture may be set based on the resolution information of the reference picture.

If sps_adaptive_resolution_enabled_flag=0 (or ref_pic_resampling_enabled_flag=0) (S920), the resolution of the reference picture may be set on a per-sequence basis as in the conventional method. If ref_pic_resolution_same_as_pic_resolution_flag=1 (S940), the resolution of the reference picture may be set based on the maximum resolution information.

Resolution Information of the Output Picture

The video encoding apparatus may signal the resolution information (i.e., output_pic_width_in_luma_samples and output_pic_height_in_luma_samples) of the output picture when sps_adaptive_resolution_enabled_flag equals to 1 (or ref_pic_resampling_enabled_flag equals to 1) (Table 8), alternatively, the video encoding apparatus may signal the resolution information when sps_adaptive_resolution_enabled_flag equals to 1 (or ref_pic_resampling_enabled_flag equals to 1) and the resolution of the output picture is different from the maximum resolution (Table 9). In Tables 8 and 9, it is shown that the resolution information of the output picture is defined in position of the SPS (sequence parameter set), but as mentioned above, the resolution information of the output picture may be defined in one or more positions of the PPS, the picture-level header, and the slice header.

TABLE 8

| | Descriptor |
|---|---|
| seq_parameter_set_rbsp( ) { | |
|   sps_adaptive_resolution_enabled_flag | u(1) |
|   if ( sps_adaptive_resolution_enabled_flag ) { | |
|     output_pic_width_in_luma_samples | ue(v) |
|     output_pic_height_in_luma_samples | ue(v) |
|   } | |
| } | |

TABLE 9

| | Descriptor |
|---|---|
| seq_parameter_set_rbsp( ) { | |
|   ... | |
|   sps_adaptive_resolution_enabled_flag | u(1) |
|   if ( sps_adaptive_resolution_enabled_flag ) { | |
|     output_pic_resolution_same_as_max_resolution_flag | u(1) |
|     if ( !output_pic_resolution_same_as_max_resolution_flag ) { | |
|       output_pic_width_in_luma_samples | ue(v) |
|       output_pic_height_in_luma_samples | ue(v) |
|     } | |
|   } | |
| } | |

In Table 9, output_pic_resolution_same_as_max_resolution_flag is a flag (same flag) indicating whether the resolution of the output picture is equal to the maximum resolution.

output_pic_resolution_same_as_max_resolution_flag=1 indicates that the resolution of the output picture is equal to the maximum resolution, and output_pic_resolution_same_as_max_resolution_flag=0 indicates that the resolution of the output picture is different from the maximum resolution.

In the instance of Table 8, in case of sps_adaptive_resolution_enabled_flag=1 (or ref_pic_resampling_enabled_flag=1), the video decoding apparatus may decode the resolution information of the output picture from the bitstream. In this case, the resolution of the output picture may be set based on the resolution information of the output picture. On the other hand, if sps_adaptive_resolution_enabled_flag=0 (or ref_pic_resampling_enabled_flag=0), the resolution of the output picture may be set on a per-sequence basis as in the conventional method.

In the instance of Table 9, the video decoding apparatus may decode sps_adaptive_resolution_enabled_flag (or ref_pic_resampling_enabled_flag) from the bitstream (S1010). In case of sps_adaptive_resolution_enabled_flag=1 (or ref_pic_resampling_enabled_flag=1) (S1020), output_pic_resolution_same_as_max_resolution_flag may be decoded from the bitstream (S1030), and in case of output_pic_resolution_same_as_max_resolution_flag=0 (S1040), the resolution information of the output picture may be decoded from the bitstream (S1050). In this case, the resolution of the output picture may be set based on the resolution information of the output picture.

If sps_adaptive_resolution_enabled_flag=0 (or ref_pic_resampling_enabled_flag=0) (S1020), the resolution of the output picture may be set on a per-sequence basis as in the conventional method. If output_pic_resolution_ same_as_max_resolution_flag=1 (S1040), the resolution of the output picture may be set based on the maximum resolution information.

Example 2

Example 2 is directed to a method of setting a resolution on the premise that two or more of the decoded picture, the reference picture, and the output picture have the same resolution. The maximum resolution information may be signaled and decoded in the same manner as described in Example 1.

Example 2-1

Example 2-1 is directed to a method of signaling resolution information on the premise that the decoded picture, the reference picture, and the output picture all have the same resolution.

Since the decoded picture, the reference picture, and the output picture have the same resolution, the video encoding apparatus may signal only one among the resolution information of the decoded picture, the resolution information of the reference picture, and the resolution information of the output picture. An example of signaling only resolution information of the decoded picture is the same as those shown in Table 4 or 5, an example of signaling only resolution information of the reference picture is the same as those shown in Table 6 or 7, and an example of signaling only resolution information of the output picture is the same as those shown in Table 8 or 9.

For example, in the instance of Table 4, in case of sps_adaptive_resolution_enabled_flag=1 (or ref_pic_resampling_enabled_flag=1), the video decoding apparatus may decode the resolution information of the decoded picture from the bitstream. In this case, the resolution of the decoded picture may be set based on the resolution information of the decoded picture. Further, since the resolution information of the decoded picture may also be used as the resolution information of the reference picture and the resolution information of the output picture, so the resolution of the reference picture and the resolution of the output picture may be set based on the resolution information of the decoded picture.

As another example, in the instance of Table 5, the video decoding apparatus may decode sps_adaptive_resolution_enabled_flag (or ref_pic_resampling_enabled_flag) from the bitstream, and may decode pic_resolution_same_as_max_resolution_flag from the bitstream in case of sps_adaptive_resolution_enabled_flag=1 (or ref_pic_resampling_enabled_flag=1), and may decode the resolution information of the decoded picture from the bitstream in case of pic_resolution_same_as_max_resolution_flag=0. In this case, not only the resolution of the decoded picture, but also the resolution of the reference picture and the resolution of the output picture may be set based on the resolution information of the decoded picture.

Example 2-2

Example 2-2 is directed to a method of signaling resolution information on the premise that the decoded picture and the output picture have the same resolution.

Since the decoded picture and the output picture have the same resolution, the video encoding apparatus may signal only one of the resolution information of the decoded picture and the resolution information of the output picture. An example of signaling only resolution information of the decoded picture is the same as those shown in Table 4 or 5, and an example of signaling only resolution information of the output picture is the same as those shown in Table 8 or 9. Meanwhile, the resolution information of the reference picture may be signaled the same as those shown in Table 6 or 9.

For example, in the instance of Table 4, in case of sps_adaptive_resolution_enabled_flag=1 (or ref_pic_resampling_enabled_flag=1), the video decoding apparatus may decode the resolution information of the decoded picture from the bitstream. In this case, the resolution of the decoded picture may be set based on the resolution information of the decoded picture. Further, since the resolution information of the decoded picture may be used as resolution information of the output picture, the resolution of the output picture may be set based on the resolution information of the decoded picture.

As another example, in the instance of Table 5, the video decoding apparatus may decode sps_adaptive_resolution_enabled_flag (or ref_pic_resampling_enabled_flag) from the bitstream, and may decode pic_resolution_same_as_max_resolution_flag from the bitstream in case of sps_adaptive_resolution_enabled_flag=1 (or ref_pic_resampling_enabled_flag=1), and may decode the resolution information of the decoded picture from the bitstream in case of pic_resolution_same_as_max_resolution_flag=0. In this case, not only the resolution of the decoded picture but also the resolution of the output picture may be set based on the resolution information of the decoded picture.

The method of setting the resolution of the reference picture based on the resolution information of the reference picture may be the same as the example described in Example 1.

According to one embodiment, in Example 2-2, it may be further premised that the resolution of the reference picture is equal to the maximum resolution. The video encoding apparatus does not signal resolution information of the reference picture, and the video decoding apparatus may set the resolution of the reference picture based on the maximum resolution information.

Example 2-3

Example 2-3 is directed to a method of signaling resolution information on the premise that a reference picture and an output picture have the same resolution.

Since the reference picture and the output picture have the same resolution, the video encoding apparatus may signal only one of the resolution information of the reference picture and the resolution information of the output picture. An example of signaling only the resolution information of the reference picture is the same as those shown in Table 6 or 7, and an example of signaling only the resolution information of the output picture is the same as those shown in Table 8 or 9. Meanwhile, the resolution information of the decoded picture may be signaled the same as those shown in Table 4 or 5.

For example, in the instance of Table 6, in case of sps_adaptive_resolution_enabled_flag=1 (or ref_pic_resampling_enabled_flag=1), the video decoding apparatus may decode the resolution information of the reference picture from the bitstream. In this case, the resolution of the reference picture may be set based on the resolution information of the reference picture. Further, since the resolution information of the reference picture may be used as the resolution information of the output picture, the resolution of the output picture may be set based on the resolution information of the reference picture.

As another example, in the instance of Table 7, the video decoding apparatus may decode sps_adaptive_resolution_enabled_flag (or ref_pic_resampling_enabled_flag) from the bitstream, and in case of sps_adaptive_resolution_enabled_flag=1 (or ref_pic_resampling_enabled_flag=1), may decode ref_pic_resolution_same_as_pic_resolution_flag from the bitstream, and in case of ref_pic_resolution_same_as_pic_resolution_flag=0, may decode the resolution information of the reference picture from the bitstream. In this case, not only the resolution of the reference picture but also the resolution of the output picture may be set based on the resolution information of the reference picture.

The method of setting the resolution of the decoded picture based on the resolution information of the decoded picture may be the same as the example described in Example 1.

According to one embodiment, in Example 2-3, it may be further premised that the resolution of the decoded picture is equal to the maximum resolution. In this case, the video encoding apparatus does not signal the resolution information of the decoded picture, and the video decoding apparatus may set the resolution of the decoded picture based on the maximum resolution information.

Example 2-4

Example 2-4 is directed to a method of signaling resolution information on the premise that the decoded picture and the reference picture have the same resolution.

Since the decoded picture and the reference picture have the same resolution, the video encoding apparatus may signal only one of the resolution information of the decoded picture and the resolution information of the reference picture. An example of signaling only the resolution information of the decoded picture is the same as those shown in Table 4 or 5, and an example of signaling only the resolution information of the reference picture is the same as those shown in Table 6 or 7. Meanwhile, the resolution information of the output picture may be signaled the same as those shown in Table 8 or 9.

For example, in the instance of Table 4, in case of sps_adaptive_resolution_enabled_flag=1 (or ref_pic_resampling_enabled_flag=1), the video decoding apparatus may decode the resolution information of the decoded picture from the bitstream. According to one embodiment, the video decoding apparatus may decode the resolution information of the decoded picture from the bitstream regardless of the value of sps_adaptive_resolution_enabled_flag (or the value of ref_pic_resampling_enabled_flag). In this case, the resolution of the decoded picture may be set based on the resolution information of the decoded picture. Further, since the resolution information of the decoded picture can also be used as the resolution information of the reference picture that is stored in the buffer for using the decoded picture as the reference picture later, the resolution of the reference picture may be set based on the resolution information of the decoded picture.

As another example, in the instance of Table 5, the video decoding apparatus may decode sps_adaptive_resolution_enabled_flag (or ref_pic_resampling_enabled_flag) from the bitstream, and may decode pic_resolution_same_as_max_resolution_flag from the bitstream in case of sps_adaptive_resolution_enabled_flag=1 (or ref_pic_resampling_enabled_flag=1), and may decode the resolution information of the decoded picture from the bitstream in case of pic_resolution_same_as_max_resolution_flag=0. In this case, not only the resolution of the decoded picture but also the resolution of the reference picture may be set based on the resolution information of the decoded picture.

The method of setting the resolution of the output picture based on the resolution information of the output picture may be the same as the example described in Example 1.

According to one embodiment, in Example 2-4, it may be further premised that the resolution of the output picture is equal to the maximum resolution. The video encoding apparatus does not signal the resolution information of the output picture, and the video decoding apparatus may set the resolution of the output picture based on the maximum resolution information.

Example 3

Example 3 is directed to a method of setting a resolution using candidate resolutions.

decoding a picture, or may be predefined in the video encoding/decoding apparatus. In the former case, syntax elements for constructing the candidate list may be signaled from the video encoding apparatus to the video decoding apparatus. The syntax elements for constructing the candidate list may be defined in the SPS. That is, the candidate list may be configured on a per-sequence basis.

One of the candidate resolutions included in the candidate list may be set as the resolution of the current picture. The candidate resolution to be set as the resolution of the current picture may be a candidate resolution indicated by indication information (resolution information). The indication information may be an index indicating any one of the candidate resolutions or may include a plurality of syntax elements. The indication information may be defined at one or more positions among the PPS, the slice header, and the tile group header and signaled from the video encoding apparatus to the video decoding apparatus.

Example 3-1

Example 3-1 is directed to a method in which a candidate list is constructed for each process of encoding/decoding a picture, the candidate resolution is the number of samples, and an index is used as the indication information.

The video encoding apparatus may encode and signal syntax elements for constructing the candidate list. As shown in Table 10, the syntax elements for constructing the candidate list may include a syntax element (num_pic_size_in_luma_samples_minus1) indicating the number of candidate resolutions included in the candidate list and the number of samples (pic_width_in_luma_samples[i] and pic_height_in_luma_samples[i]) of each of the candidate resolutions indicated by num_pic_size_in_luma_samples_minus1.

TABLE 10

| | Descriptor |
| --- | --- |
| seq_parameter_set_rbsp( ) { | |
|   sps_adaptive_resolution_enabled_flag | u(1) |
|   if ( sps_adaptive_resolution_enabled_flag ) { | |
|     num_pic_size_in_luma_samples_minus1 | ue(v) |
|     for ( i = 0; i <= num_pic_size_in_luma_samples_minus1; i++ ) { | |
|       pic_width_in_luma_samples[ i ] | ue(v) |
|       pic_height_in_luma_samples[ i ] | ue(v) |
|     } | |
|   } | |
| } | |

The candidate resolutions may be candidates that can be set as the resolution of the current picture. The candidate resolution may be the number of samples in the decoded picture, the reference picture, or the output picture, i.e., and may be represented in the unit of sample or pixel. For example, when the maximum resolution is 1920×1080, the candidate resolutions may be (1920×1080), (960×540), and the like. According to one embodiment, the candidate resolution may be a ratio indicating the resolution of the current picture with respect to the size of the maximum resolution information. For example, the ratio of the candidate resolutions may be 1 (maximum resolution:resolution of the current picture=1:1), 1/2 (maximum resolution:resolution of the current picture=2:1), and the like.

One or more candidate resolutions may constitute a candidate resolution list (simply, candidate list). The candidate list may be configured for each process of encoding/

The video decoding apparatus may decode enable information (sps_adaptive_resolution_enabled_flag or ref_pic_resampling_enabled_flag) from the bitstream (S1110), and in case of sps_adaptive_resolution_enabled_flag=1 or ref_pic_resampling_enabled_flag=1 (S1120), may decode num_pic_size_in_min from the bitstream (S1130). Further, the video decoding apparatus may decode pic_width_in_luma_samples[i] and pic_height_in_luma_samples[i] by "+1" more than the number indicated by num_pic_size_in_luma_samples_minus1 (S1140). Thereafter, a candidate list may be constructed based on syntax elements for constructing the candidate list.

As shown in Table 11, the video encoding apparatus may encode and signal an index (pic_size_in_luma_samples_idx) for one candidate resolution determined as the resolution of the current picture among the candidate resolutions included in the candidate list.

TABLE 11

|  | Descriptor |
|---|---|
| pic_parameter_set_rbsp( ) {<br>  if ( sps_adaptive_resolution_enabled_flag )<br>    pic_size_in_luma_samples_idx<br>} | <br><br>ue(v)<br> |

In case of sps_adaptive_resolution_enabled_flag=1 or ref_pic_resampling_enabled_flag=1 (S1120), the video decoding apparatus may decode pic_size_in_luma_samples_idx from the bitstream (S1150). Further, the video decoding apparatus may set the resolution of the current picture based on the candidate resolution (i.e., the number of samples indicated by the candidate resolution) indicated by the decoded pic_size_in_luma_samples_idx.

Example 3-2

Example 3-2 is directed to a method in which a candidate list is constructed for each process of encoding/decoding a picture, the candidate resolution is a ratio to the maximum resolution, and an index is used as the indication information.

The video encoding apparatus may encode and signal syntax elements for constructing the candidate list. As shown in Table 12, the syntax elements for constructing the candidate list may include a syntax element (num_pic_size_ratio_minus1) indicating the number of candidate resolution ratios included in the candidate list and a ratio (pic_size_ratio[i]) of each of the candidate resolutions indicated by num_pic_size_ratio_minus1.

TABLE 12

|  | Descriptor |
|---|---|
| seq_parameter_set_rbsp( ) {<br>  sps_adaptive_resolution_enabled_flag<br>  if ( sps_adaptive_resolution_enabled_flag ) {<br>    num_pic_size_ratio_minus1<br>    for ( i = 0; i <= num_pic_size_ratio_minus1; i++ )<br>      pic_size_ratio[ i ]<br>  }<br>} | <br>u(1)<br><br>ue(v)<br><br>ue(v)<br><br> |

The video decoding apparatus may decode enable information (sps_adaptive_resolution_enabled_flag or ref_pic_resampling_enabled_flag) from the bitstream (S1210), and in case of sps_adaptive_resolution_enabled_flag=1 or ref_pic_resampling_enabled_flag=1 (S1220), may decode num_pic_size_ratio_minus1 from the bitstream (S1230). Further, the video decoding apparatus may decode pic_size_ratio[i] by "+1" more than the number indicated by num_pic_size_ratio_minus1 (S1240). Thereafter, a candidate list may be constructed based on syntax elements for constructing the candidate list.

As shown in Table 13, the video encoding apparatus may encode and signal an index (pic_size_ratio_idx) for one candidate resolution ratio determined as the resolution of the current picture among the candidate resolution ratios included in the candidate list.

TABLE 13

|  | Descriptor |
|---|---|
| pic_parameter_set_rbsp( ) {<br>  if ( sps_adaptive_resolution_enabled_flag ) |  |

TABLE 13-continued

|  | Descriptor |
|---|---|
|     pic_size_ratio_idx<br>} | ue(v)<br> |

In case of sps_adaptive_resolution_enabled_flag=1 or ref_pic_resampling_enabled_flag=1 (S1220), the video decoding apparatus may decode pic_size_ratio_idx from the bitstream (S1250). Further, the video decoding apparatus may set the resolution of the current picture based on the candidate resolution ratio indicated by the decoded pic_size_ratio_idx.

Example 3-3

Example 3-3 is directed to a method in which candidate resolutions are predefined in the video encoding/decoding apparatus, and an index is used as the indication information.

Since the candidate resolutions are predefined, the process of signaling syntax elements for constructing the candidate list described in Embodiments 3-1 and 3-2 (Tables 10 and 12) and the process of constructing the candidate list may not be performed. Accordingly, only the process of signaling the index as the indication information (Table 11 or 13) and the process of setting the candidate resolution indicated by the index to the resolution of the current picture may be performed.

As shown in Table 11 or 13, the video encoding apparatus may encode and signal an index (pic_size_in_luma_samples_idx or pic_size_ratio_idx) for a candidate resolution set as the resolution of the current picture among the candidate resolutions.

The video decoding apparatus may decode pic_size_in_luma_samples_idx or pic_size_ratio_idx from the bitstream, and set the resolution of the current picture based on the candidate resolution indicated by pic_size_in_luma_samples_idx or pic_size_ratio_idx.

Example 3-4

Example 3-4 is directed to a method in which three candidate resolutions are predefined in the video encoding/decoding apparatus, and indication information including a plurality of syntax elements is used.

The candidate resolutions may include a first candidate resolution, a second candidate resolution, and a third candidate resolution. The candidate resolutions may be the number of samples as in Example 3-1 or a ratio as in Example 3-2.

The plurality of syntax elements constituting the indication information may include first indication information indicating whether the resolution of the current picture corresponds to the first candidate resolution, and second indication information indicating one candidate resolution to which the resolution of the current picture corresponds among the second candidate resolution and the third candidate resolution. In case the first indication information indicates that the resolution of the current picture does not correspond to the first candidate resolution, the second indication information may be signaled from the video encoding apparatus and may be decoded by the video decoding apparatus.

Figure 13:
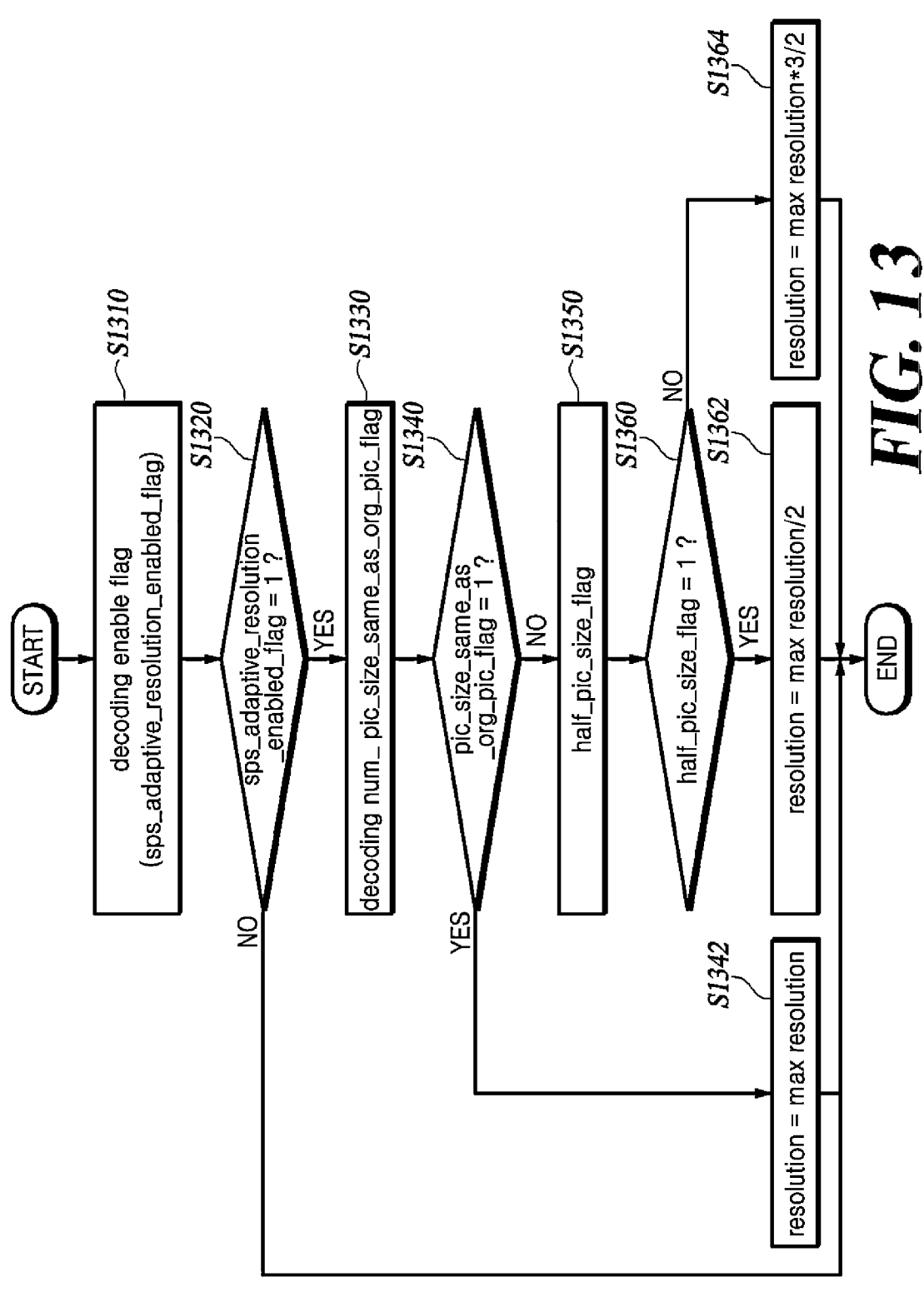
Figure 14:
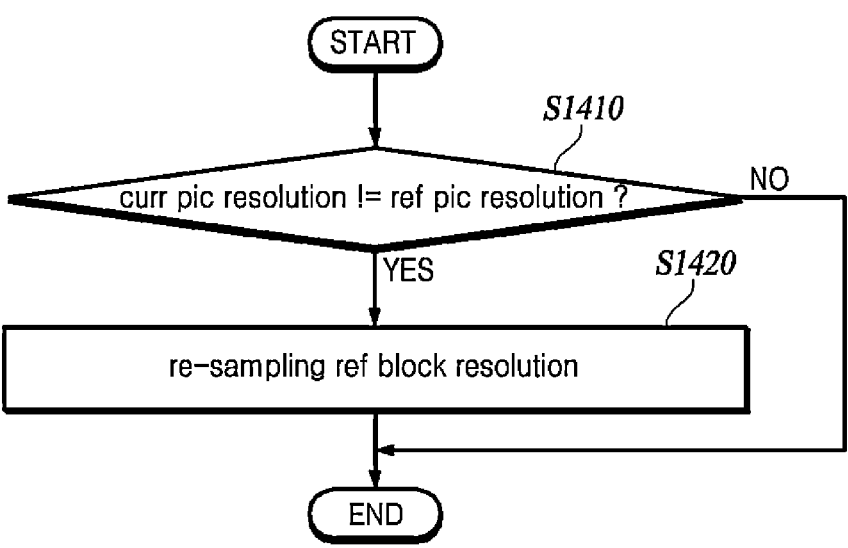
FIGS. 14 to 17 are flowcharts for explaining various embodiments of the present disclosure for re-sampling.
Figure 15:
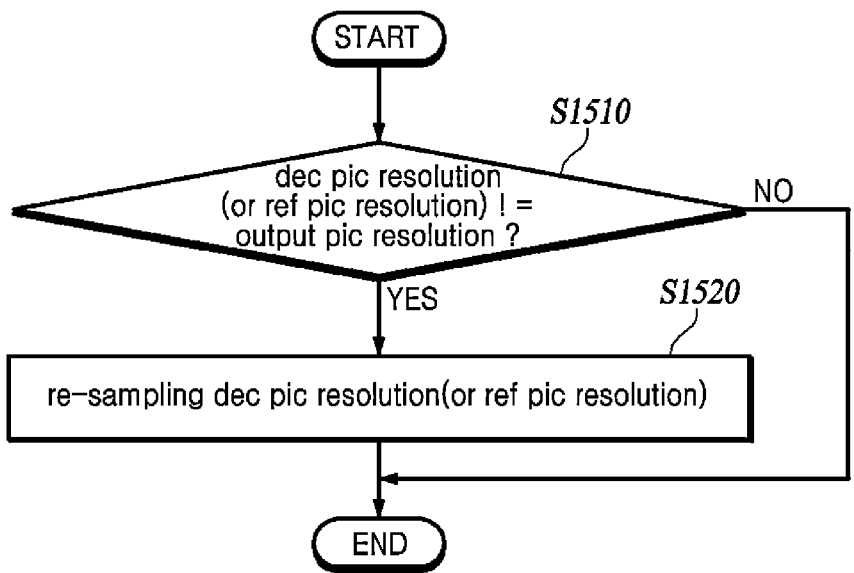
Figure 16:
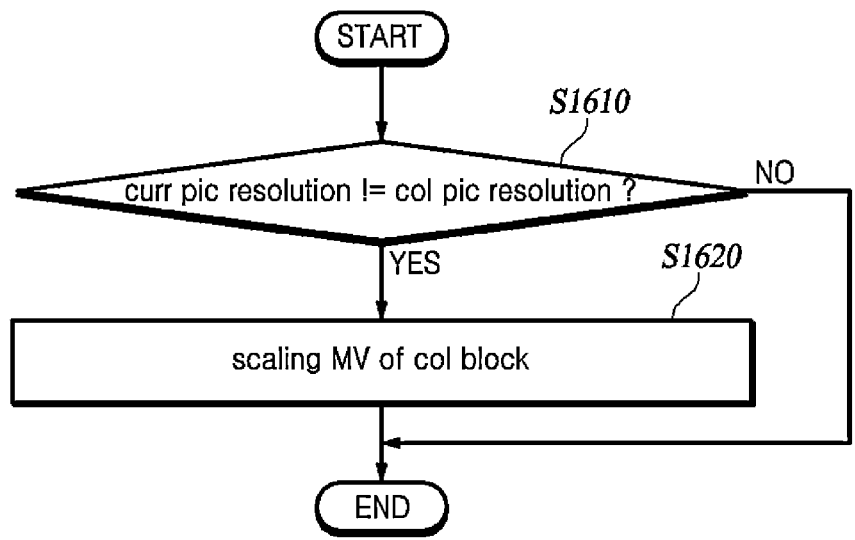

Table 14 and FIG. 13 show examples in which the first candidate resolution has a ratio of 1, the second candidate resolution has a ratio of 2/3 (=1/1.5), and the third candidate resolution has a ratio of 1/2.

TABLE 14

| | Descriptor |
|---|---|
| pic_parameter_set_rbsp( ) { | |
|   if ( sps_adaptive_resolution_enabled_flag ) { | |
|     pic_size_same_as_org_pic_flag | u(1) |
|     if ( !pic_size_same_as_max_pic_flag ) | |
|       half_pic_size_flag | u(1) |
|   } | |
| } | |

As shown in Table 14, the video encoding apparatus may determine whether the resolution of the current picture corresponds to a ratio of 1 to the maximum resolution, and may signal the result as the first indication information (pic_size_same_as_org_pic_flag). In this case, pic_size_same_as_org_pic_flag=1(on) may indicate that the resolution of the current picture has the ratio of 1 to the maximum resolution (i.e., the resolution of the original picture (org_pic)), and pic_size_same_as_org_pic_flag=0(off) may indicate that the resolution of the current picture does not have the ratio of 1 to the maximum resolution.

In case of pic_size_same_as_org_pic_flag=0, the video encoding apparatus may determine whether the resolution of the current picture corresponds to a ratio of 1/2 to the maximum resolution, and may signal the result as second indication information (half_pic_size_flag). half_pic_size_flag=1(on) may indicate that the resolution of the current picture has the ratio of 1/2 to the maximum resolution, and half_pic_size_flag=0 may indicate that the resolution of the current picture does not have the ratio of 1/2 to the maximum resolution (i.e., indicate that the resolution of the current picture has a ratio of 2/3 to the maximum resolution).

The video decoding apparatus may decode enable information (sps_adaptive_resolution_enabled_flag or ref_pic_resampling_enabled_flag) from the bitstream (S1310), and may decode pic_size_same_as_org_pic_flag from the bitstream (S1330) in case of sps_adaptive_resolution_enabled_flag=1 or ref_pic_resampling_enabled_flag=1 (S1320).

In case of pic_size_same_as_org_pic_flag=1 (S1340), the resolution of the current picture may be set to the same value as the maximum resolution (S1342). On the other hand, in case of pic_size_same_as_org_pic_flag=0 (S1340), the video decoding apparatus may further decode half_pic_size_flag from the bitstream (S1350).

In case of half_pic_size_flag=1 (S1360), the resolution of the current picture may be set to 1/2 of the maximum resolution (S1362). When half_pic_size_flag=0 (S1360), the resolution of the current picture may be set to a value of 2/3 of the maximum resolution (S1364).

Example 4

Example 4 is directed to a method of resampling a resolution which is set on a per-block basis. Resampling or scaling may be performed in the decoding control unit.

When different resolutions are set for the original picture (having maximum resolution), the decoded picture, the reference picture, and the output pictures using the methods of the present disclosure, a resampling process to compensate for the resolution mismatch may be required. Resampling may include up-sampling and down-sampling.

The resampling process may be required 1) when the resolution of the current picture and the resolution of the reference picture are different from each other, 2) when the resolution of the decoded picture and the resolution of the output picture are different from each other, 3) when the resolution of the output picture and the resolution of the reference picture are different from each other, and 4) when the resolution of the current picture and the resolution of the collocated picture are different from each other.

1) When the Resolution of the Current Picture and the Resolution of the Reference Picture are Different From Each Other In the inter prediction, the video decoding apparatus may determine whether the resolution (curr pic resolution) of the current picture having the current block and the resolution (ref pic resolution) of the reference picture to be referenced by the current block are different from each other (S1410). Motion information necessary for inter prediction may include a reference picture and a motion vector, and the motion vector and the reference block may be resampled based on the resolution of the reference picture and the resolution of the current picture. In other words, a location in the reference picture indicated by the motion vector of the current block and samples in the reference block positioned at the location may be resampled based on the resolution of the reference picture and the resolution of the current picture.

According to one embodiment, when the current picture refers to a plurality of reference pictures, the presence or absence of resampling (scaling) and/or resampling (scaling) factor/ratio may be determined depending on the resolution of the current picture and the resolution of each of the reference pictures during the process of generating/configuring the reference picture list.

When the resolution of the current picture and the resolution of the reference picture are different (curr pic resolution!=ref pic resolution), the video decoding apparatus may scale (resample) the motion vector (MV) of the current block, which indicates the location in the reference picture, according to a ratio between the resolution of the reference picture and the resolution of the current picture, and then resample the resolution (ref block resolution) of the reference block (indicated by the resampled motion vector) within the reference picture depending on the resolution (curr block resolution) of the current block (S1420). If the resolution of the current picture and the resolution of the reference picture are the same (curr pic resolution=ref pic resolution), the resampling process is not performed or the resampling process for the motion vector and the reference block may be performed with the resampling ratio set to "1".

2) When the Resolution of the Decoded Picture and the Resolution of the Output Picture are Different From Each Other When trying to output the output picture for display, the video decoding apparatus may determine whether the resolution (dec pic resolution) of the decoded picture and the resolution (output pic resolution) of the output picture (having the same poc (picture order count) value) stored in the buffer are different from each other (S1510).

When the resolution of the decoded picture and the resolution of the output picture are different from each other (dec pic resolution!=output pic resolution), the video decoding apparatus may resample the decoded picture according to a ratio between the resolution of the decoded picture and the resolution of the output picture (S1520). The resampled decoded picture may be output as an output picture. In this case, the output picture does not exist in the buffer, and the contents of the decoded picture in the buffer are not changed. If the resolution of the decoded picture and the resolution of the output picture are the same (dec pic resolution=output pic resolution), the resampling process may not be performed.

3) When the Resolution of the Output Picture and the Resolution of the Reference Picture are Different From Each Other When trying to output the output picture for display, the video decoding apparatus may determine whether the resolution (ref pic resolution) of the reference picture and the resolution (output pic resolution) of the output picture (with the same poc value) stored in the buffer are different from each other (S1510).

When the resolution of the reference picture and the resolution of the output picture are different from each other (ref pic resolution!=output pic resolution), the video decoding apparatus may resample the reference picture according to a ratio between the resolution of the reference picture and the resolution of the output picture (S1520). The resampled reference picture may be output as an output picture. In this case, the output picture does not exist in the buffer, and the contents of the reference picture in the buffer are not changed. If the resolution of the reference picture and the resolution of the output picture are the same (ref pic resolution=output pic resolution), the resampling process may not be performed.

4) When the Resolution of the Current Picture and the Resolution of the Collocated Picture are Different From Each Other (in the Process of Obtaining the Temporal MV of the Current Block)

In order to obtain a temporal MV (TMV) of the current block, the video decoding apparatus refers to motion information of a collocated block located at a given location within a collocated picture set for the current picture. In this case, the video decoding apparatus may determine whether the resolution (curr pic resolution) of the current picture containing the current block is different from the resolution (col pic resolution) of the collocated picture to be referenced for prediction of the current block (S1610). This process (S1610) may be a process of determining whether the resolution of the reference picture set in the current block and the resolution of the collocated picture are different from each other.

When the resolution of the current picture and the resolution of the collocated picture are different (curr pic resolution!=col pic resolution), the video decoding apparatus may scale (resample) the motion vector (MV) of the collocated block (BR or CT) according to a ratio between the resolution of the collocated picture and the resolution of the current picture (S1620). If the resolution of the current picture and the resolution of the collocated picture are the same, the resampling process may not be performed, or the resampling process may be performed for the motion vector and the reference block with the resampling ratio set to "1".

According to one embodiment, when the resolution of the reference picture set for the current block and the resolution of the collocated picture are different from each other (currRef pic resolution!=col pic resolution), the video decoding apparatus may scale (resample) the motion vector MV of the collocated block (BR or CT) according to a ratio between the resolution of the collocated picture and the resolution of the reference picture (S1620). If the resolution of the reference picture and the resolution of the collocated picture are the same, the resampling process may not be performed, or the resampling process for the motion vector and the reference block may be performed with the resampling ratio set to "1".

Figure 17:
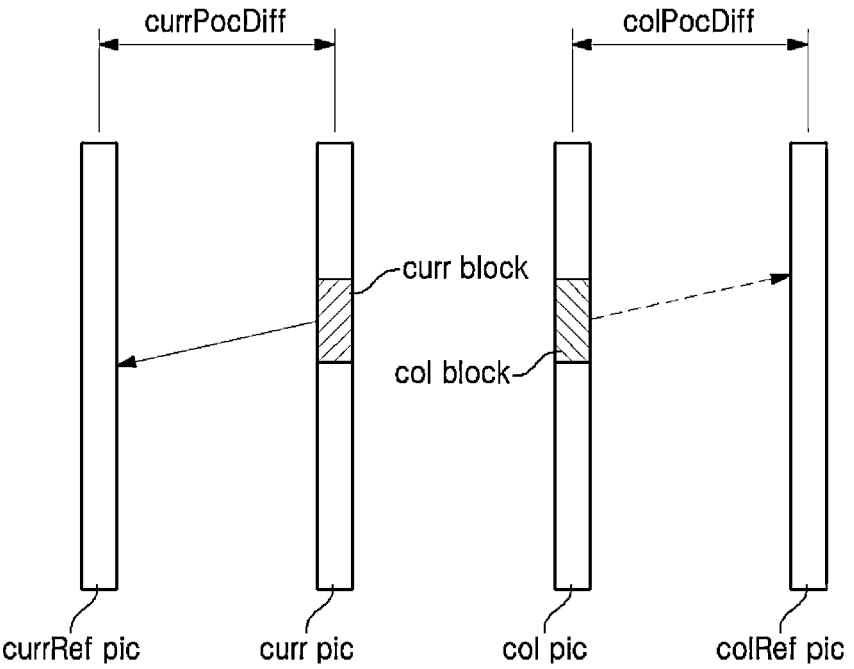

Meanwhile, the resampling process due to the resolution difference may be performed together with the scaling process due to the poc difference. An example for explaining the scaling process due to the poc difference is shown in FIG. 17.

"curr pic" indicates a current picture, "curr block" indicates a current block, "col pic" indicates a collocated picture, and "col block" indicates a collocated block. "currRef pic" indicates a reference picture referenced by a curr block in a curr pic, and "colRef pic" indicates a reference picture referenced by a col block in a col pic.

The currRef pic may be specified by a reference picture index value that is explicitly signaled in the case of the AMVP mode, and may be the 0-th reference picture in the reference picture list in the case of the merge mode. The col pic may be specified by an index (collocated_ref_idx) value that is explicitly signaled in a slice (or tile group). A flag (collocated_from_10_flag) indicating the prediction direction may also be signaled together with collocated_ref_idx. For example, if the value of collocated_from_10_flag is "on" and the collocated_ref_idx value is "1", the first reference picture in the list may be specified as "col pic".

When the col pic is specified, a col block (in col pic) corresponding to the curr block can be derived. The col block may be a block located at the same location in the col pic as the location of the curr block in the curr pic. Based on the location of the col block, the TMV (straight arrow in FIG. 17) of the curr block may be derived from motion information (dashed arrow in FIG. 17) of a block at a BR (bottom right) position or a block at a CT (center) position.

To derive the TMV, the poc difference between "curr pic" and "currRef pic" and the poc difference between "col pic" and "colRef pic" may be used.

In this case, as described above, when the resolution of the curr pic and the resolution of the col pic are different from each other, the process of resampling (scaling) the MV of the BR block or the CT block may be further performed according to a ratio between the resolution of the col picture and the resolution of the curr picture. Alternatively, when the resolution of the currRef pic and the resolution of the col pic are different from each other, the process of resampling (scaling) the MV of the BR block or the CT block may be further performed according to a ratio between the resolution of the col picture and the resolution of the currRef picture. Alternatively, when the resolution of the currRef pic and the resolution of the col pic are different from each other, the TMV may not be added to the candidate MV list. That is, when the resolution of the currRef pic and the resolution of the col pic are different from each other, the TMV function may be "off".

According to one embodiment, when the resolution of the current picture and the resolution of the reference picture for the current block are different from each other (accordingly, when scaling is applied), some of the inter encoding/decoding methods referring to the reference picture may be "off". For example, when the resolution of the current picture and the resolution of the reference picture for the current block are different from each other, DMVR (decoder MV refinement), PROF (prediction refinement with optical flow), and BDOF (bi-directional optical flow) may be "off".

Although exemplary embodiments of the present invention have been described for illustrative purposes, those skilled in the art will appreciate that and various modifications and changes are possible, without departing from the idea and scope of the invention. Exemplary embodiments have been described for the sake of brevity and clarity. Accordingly, one of ordinary skill would understand that the scope of the embodiments is not limited by the embodiments explicitly described above but is inclusive of the claims and equivalents thereto.

What is claimed is:

1. An apparatus of decoding a video sequence of pictures by adaptively setting a picture resolution, the apparatus comprising at least one processor configured to:

decode, from a sequence parameter set referred by all of the pictures belonging to the video sequence, a flag indicating whether it is allowed that at least one picture of the video sequence has a different size than a reference picture referred by the at least one picture;

decode maximum resolution information from the sequence parameter set, wherein the maximum resolution information specifies a maximum size of each decoded picture referring to the sequence parameter set;

decode resolution information for a current picture from a picture parameter set which is a lower level than the sequence parameter set, wherein the picture parameter set is a parameter set referred by one or more pictures belonging to the video sequence, and wherein the resolution information for the current picture specifies a size of the current picture which is less than or equal to the maximum size, and includes a first syntax element specifying a width of the current picture and a second syntax element specifying a height of the current picture;

for decoding a current block within the current picture in an inter-prediction, compare the size of the current picture with a size of a reference picture to be referenced by the current block;

determine a motion vector of the current block;

based on the size of the current picture and the size of the reference picture, resample a sample location in the reference picture indicated by the motion vector and resample sample locations in a reference block which is positioned at the sample location in the reference picture;

generate a prediction block of the current block by predicting the current block using samples which correspond to the sample locations in the reference picture; and reconstruct the current block based on the prediction block.

2. The apparatus of claim 1, wherein the resolution information for the current picture further includes resolution information of an output picture specifying a resolution at which a reconstructed picture of the current picture is output as the output picture.

3. The apparatus of claim 1, wherein when the size of the current picture is different from the size of the reference picture, among inter prediction decoding methods, application of at least one of DMVR (decoder MV refinement), PROF (prediction refinement with optical flow), and BDOF (bi-directional optical flow) is off.

4. An apparatus of encoding a video sequence of pictures by adaptively setting a picture resolution, the apparatus comprising at least one processor configured to:

encode, into a sequence parameter set referred by all of the pictures belonging to the video sequence, a flag indicating that it is allowed that at least one picture of the video sequence has a different size than a reference picture referred by the at least one picture;

encode maximum resolution information into the sequence parameter set, wherein the maximum resolution information specifies a maximum size of each decoded picture referring to the sequence parameter set;

encode resolution information for a current picture into a picture parameter set which is a lower level than the sequence parameter set, wherein the picture parameter set is a parameter set referred by one or more pictures belonging to the video sequence, and wherein the resolution information for the current picture specifies a size of the current picture which is less than or equal to the maximum size, and includes a first syntax element specifying a width of the current picture and a second syntax element specifying a height of the current picture;

for encoding a current block within the current picture in an inter-prediction, compare the size of the current picture with a size of a reference picture to be referenced by the current block;

determine a motion vector of the current block;

based on the size of the current picture and the size of the reference picture, resample a sample location in the reference picture indicated by the motion vector and resample sample locations in a reference block which is positioned at the sample location in the reference picture;

generate a prediction block of the current block by predicting the current block using samples which correspond to the sample locations in the reference picture; and encode a residual block of the current block based on the prediction block.

5. An apparatus of transmitting video data to a video decoding apparatus, the apparatus comprising at least one processor configured to:

encode a video sequence of pictures with adaptively setting a picture resolution to generate a bitstream containing the encoded video sequence; and transmit the bitstream to the video decoding apparatus, wherein the at least one processor is configured to encode the video sequence of pictures by:

encoding, into a sequence parameter set referred by all of the pictures belonging to the video sequence, a flag indicating that it is allowed that at least one picture of the video sequence has a different size than a reference picture referred by the at least one picture;

encoding maximum resolution information into the sequence parameter set, wherein the maximum resolution information specifies a maximum size of each decoded picture referring to the sequence parameter set;

encoding resolution information for a current picture into a picture parameter set which is a lower level than the sequence parameter set, wherein the picture parameter set is a parameter set referred by one or more pictures belonging to the video sequence, and wherein the resolution information for the current picture specifies a size of the current picture which is less than or equal to the maximum size, and includes a first syntax element specifying a width of the current picture and a second syntax element specifying a height of the current picture;

for encoding a current block within the current picture in an inter-prediction, comparing the size of the current picture with a size of a reference picture to be referenced by the current block;

determining a motion vector of the current block;

based on the size of the current picture and the size of the reference picture, resampling a sample location in the reference picture indicated by the motion vector and resampling sample locations in a reference block which is positioned at the sample location in the reference picture;

generating a prediction block of the current block by predicting the current block using samples which correspond to the sample locations in the reference picture; and encoding a residual block of the current block based on the prediction block.

\* \* \* \* \*